United States Patent
Ariazi et al.

(10) Patent No.: US 12,454,724 B2
(45) Date of Patent: *Oct. 28, 2025

(54) METHODS AND SYSTEMS FOR HIGH-DEPTH SEQUENCING OF METHYLATED NUCLEIC ACID

(71) Applicant: Freenome Holdings, Inc., South San Francisco, CA (US)

(72) Inventors: Eric Ariazi, Redwood City, CA (US); David Weinberg, San Francisco, CA (US); Greg Hogan, San Francisco, CA (US); John St. John, Brisbane, CA (US); Michael Pearson, San Francisco, CA (US)

(73) Assignee: Freenome Holdings, Inc., Brisbane, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,128

(22) Filed: Feb. 1, 2023

(65) Prior Publication Data

US 2023/0323446 A1  Oct. 12, 2023

Related U.S. Application Data

(63) Continuation of application No. 17/173,770, filed on Feb. 11, 2021, which is a continuation of application No. PCT/US2020/035380, filed on May 29, 2020.

(60) Provisional application No. 62/855,795, filed on May 31, 2019.

(51) Int. Cl.
   *C12Q 1/6869* (2018.01)
   *C12Q 1/6855* (2018.01)
   *C12Q 1/686* (2018.01)
   *C12Q 1/6876* (2018.01)

(52) U.S. Cl.
   CPC ......... *C12Q 1/6869* (2013.01); *C12Q 1/6855* (2013.01); *C12Q 1/686* (2013.01); *C12Q 1/6876* (2013.01); *C12Q 2600/154* (2013.01)

(58) Field of Classification Search
   CPC .... C12Q 1/6869; C12Q 1/6855; C12Q 1/686; C12Q 2600/154
   See application file for complete search history.

(56) References Cited

U.S. PATENT DOCUMENTS

| | | |
|---|---|---|
| 5,786,146 A | 7/1998 | Herman et al. |
| 7,270,960 B2 | 9/2007 | Hellstrom et al. |
| 7,727,720 B2 | 6/2010 | Dhallan |
| 7,754,429 B2 | 7/2010 | Rigatti et al. |
| 8,168,385 B2 | 5/2012 | Brenner |
| 8,318,433 B2 | 11/2012 | Brenner |
| 9,035,035 B2 | 5/2015 | Cherkasov et al. |
| 9,040,239 B1 | 5/2015 | Zheng et al. |
| 9,080,210 B2 | 7/2015 | Van Eijk et al. |
| 9,447,452 B2 | 9/2016 | Rao et al. |
| 10,081,830 B2 | 9/2018 | Nitta |
| 10,337,053 B2 | 7/2019 | Rao et al. |
| 10,443,091 B2 | 10/2019 | Rao et al. |
| 10,533,213 B2 | 1/2020 | Rao et al. |
| 10,731,204 B2 | 8/2020 | Rao et al. |
| 10,767,216 B2 | 9/2020 | Rao et al. |
| 10,774,373 B2 | 9/2020 | Rao et al. |
| 10,978,175 B2 | 4/2021 | Van Eijk et al. |
| 11,072,818 B2 | 7/2021 | Rao et al. |
| 11,208,683 B2 | 12/2021 | Rao et al. |
| 11,514,289 B1 | 11/2022 | Otte et al. |
| 11,681,953 B2 | 6/2023 | Drake et al. |
| 11,781,959 B2 | 10/2023 | Delubac |
| 11,847,532 B2 | 12/2023 | Drake et al. |
| 2004/0072197 A1 | 4/2004 | Jones et al. |
| 2010/0131286 A1 | 5/2010 | Houlgatte et al. |
| 2010/0151471 A1 | 6/2010 | Faham et al. |
| 2014/0365243 A1 | 12/2014 | Varadan et al. |
| 2015/0284769 A1 | 10/2015 | Schroeder |
| 2016/0153054 A1 | 6/2016 | Feng et al. |
| 2016/0210403 A1* | 7/2016 | Zhang .................. G16B 40/30 |
| 2017/0198344 A1 | 7/2017 | Vaisvila et al. |

(Continued)

FOREIGN PATENT DOCUMENTS

| | | |
|---|---|---|
| JP | 2018508228 A | 3/2018 |
| WO | WO-2011009941 A1 | 1/2011 |

(Continued)

OTHER PUBLICATIONS

Aalipour et al. Engineered Immune Cells as Highly Sensitive Cancer Diagnostics. Nature Biotechnology 37(5):531-539 (May 2019).

Akalin et al. MethylKit: A Comprehensive R Package for the Analysis of Genome-Wide DNA Methylation Profiles. Genome Biology 13(10):R87 (2012).

Ambrosi et al. Dynamics and Context-Dependent Roles of DNA Methylation. Journal of Molecular Biology 429(10):1459-1775 (May 2017).

Ananthakrishnan et al. Epidemiology and risk factors for IBD. Nat Rev Gastroenterol Hepatol 12(4):205-17 (2015).

(Continued)

*Primary Examiner* — Joseph G. Dauner
(74) *Attorney, Agent, or Firm* — WILSON SONSINI GOODRICH & ROSATI

(57) ABSTRACT

Methods and systems provided herein address current limitations of bisulfite-based methylation sequencing by improving the quality and accuracy of nucleic acid methylation sequencing and uses thereof for detection of disease. Methods that include minimally-destructive conversion methods for methylation sequencing as well as specialized UMI adapters provide for improved quality of sequencing libraries and sequencing information. Greater accuracy and more complete methylation-state information permits higher quality feature generation for use in machine learning models and classifier generation.

16 Claims, 6 Drawing Sheets

Specification includes a Sequence Listing.

(56) References Cited

U.S. PATENT DOCUMENTS

| | | |
|---|---|---|
| 2017/0277844 A1 | 9/2017 | Apte et al. |
| 2017/0357763 A1 | 12/2017 | Apte et al. |
| 2018/0044731 A1 | 2/2018 | Valouev et al. |
| 2018/0102187 A1 | 4/2018 | Apte et al. |
| 2018/0119137 A1 | 5/2018 | Matsuguchi et al. |
| 2018/0208992 A1 | 7/2018 | Langevin et al. |
| 2020/0232894 A1 | 7/2020 | Delubac |
| 2021/0010076 A1 | 1/2021 | Delubac et al. |
| 2021/0057046 A1 | 2/2021 | Liu et al. |
| 2021/0174958 A1 | 6/2021 | Drake et al. |
| 2021/0210205 A1 | 7/2021 | Drake et al. |
| 2021/0230684 A1 | 7/2021 | Ariazi et al. |
| 2021/0272653 A1 | 9/2021 | Ulz et al. |

FOREIGN PATENT DOCUMENTS

| | | | | |
|---|---|---|---|---|
| WO | WO-2015070086 A1 | 5/2015 | | |
| WO | WO-2015104302 A1 * | 7/2015 | ............. | C07H 21/04 |
| WO | WO-2016119190 A1 | 8/2016 | | |
| WO | WO-2017075436 A1 | 5/2017 | | |
| WO | WO-2018094031 A1 | 5/2018 | | |
| WO | WO-2018175997 A1 | 9/2018 | | |
| WO | WO-2019006269 A1 | 1/2019 | | |
| WO | WO-2019060716 A1 | 3/2019 | | |
| WO | WO-2019100024 A1 | 5/2019 | | |
| WO | WO-2019136413 A4 * | 8/2019 | ........... | C12N 9/0071 |
| WO | WO-2019147663 A1 | 8/2019 | | |
| WO | WO-2019191649 A1 | 10/2019 | | |
| WO | WO-2019195268 A2 | 10/2019 | | |
| WO | WO-2019200410 A1 | 10/2019 | | |
| WO | WO-2020076772 A1 | 4/2020 | | |
| WO | WO-2020243609 A1 | 12/2020 | | |
| WO | WO-2021202351 A1 | 10/2021 | | |
| WO | WO-2021222220 A2 | 11/2021 | | |
| WO | WO-2022076237 A1 | 4/2022 | | |
| WO | WO-2022140116 A1 | 6/2022 | | |
| WO | WO-2022204358 A1 | 9/2022 | | |
| WO | WO-2022261192 A1 | 12/2022 | | |
| WO | WO-2023003851 A1 | 1/2023 | | |
| WO | WO-2023147472 A1 | 8/2023 | | |
| WO | WO-2023183468 A2 | 9/2023 | | |
| WO | WO-2023235878 A2 | 12/2023 | | |
| WO | WO-2023244983 A1 | 12/2023 | | |
| WO | WO-2023250441 A2 | 12/2023 | | |

OTHER PUBLICATIONS

Ariazi et al. A New Role for ERa:Silencing via DNA Methylation of Basal, Stem Cell, and EMT Genes. Molecular Cancer Research 15(2):152-164 (Feb. 2017).

Asmus et al. Simultaneous Targeted Methylation Sequencing (sTM-Seq). Curr Protoc Hum Genet 101(1):e81, pp. 1-19 doi:10.1002/cphg.81 (2019).

Barault et al. Discovery of Methylated Circulating DNA Biomarkers for Comprehensive Non-Invasive Monitoring of Treatment Response in Metastatic Colorectal Cancer. Gut 67(11):1995-2005 (epub 2017; Nov. 2018).

Barnett et al. ATAC-Me Captures Prolonged DNA Methylation of Dynamic Chromatin Accessibility Loci during Cell Fate Transitions. Molecular Cell 77(6):1350-1364.e6. (Mar. 2020).

Bartak et al. Colorectal Adenoma and Cancer Detection Based on Altered Methylation Pattern of SFRP1, SFRP2, SDC2, and PRIMA1 in Plasma Samples. Epigenetics 12(9):751-763 (2017).

Baylin et al. A Decade of Exploring the Cancer Epigenome—Biological and Translational Implications. Nat Rev Cancer 11(10):726-734 (2011).

Baylin et al. Epigenetic Determinants of Cancer. Cold Spring Harbor Perspectives in Biology 8(9):a019505 [1-36] (2016).

Berman et al. Regions of Focal DNA Hypermethylation and Long-Range Hypomethylation in Colorectal Cancer Coincide with Nuclear Lamina-Associated Domains. Nature Genetics 44(1):40-46 (Jan. 2012).

Best et al. RNA-Seq of Tumor-Educated Platelets Enables Blood-Based Pan-Cancer, Multiclass, and Molecular Pathway Cancer Diagnostics. Cancer Cell 28(5):666-676 (2015).

Bokelmann et al. Reconstructing Double-Stranded DNA Fragments on a Single-Molecule Level Reveals Patterns of Degradation in Ancient Samples. Genome Research 30(10):1449-1457 (Oct. 2020).

Booth et al. Quantitative Sequencing of 5-Methylcytosine and 5-Hydroxymethylcytosine at Single-Base Resolution. Science 336(6083):934-937 (2012).

Bormann et al. Cell-of-Origin DNA Methylation Signatures Are Maintained during Colorectal Carcinogenesis. Cell Reports 23(11):3407-3418 (Jun. 2018).

Bowman et al. TET2 in Normal and Malignant Hematopoiesis. Cold Spring Harbor Perspectives in Medicine 7(8):a026518 (Aug. 2017).

Bramsen et al. Molecular-Subtype-Specific Biomarkers Improve Prediction of Prognosis in Colorectal Cancer. Cell Reports 19:1268-1280 (2017).

Bullman. How the Microbiome Impacts Cancer, Immunity, and Response to Therapy. Presentation slides San Francisco Jan. 25, 2020 (10 pgs).

Campan et al. MethyLight and Digital MethyLight. In DNA Methylation Protocols, Methods in Molecular Biology 1708:497-513 (2018).

Caspi-Fluger et al. Rickettsia 'In' and 'Out':Two Different Localization Patterns of a Bacterial Symbiont in the Same Insect Species. Edited by Richard Cordaux. PLoS One 6(6):e21096 (2011).

Cassinotti et al. DNA Methylation Patterns in Blood of Patients with Colorectal Cancer and Adenomatous Colorectal Polyps. Int. J. Cancer 131(5):1153-1157 (2012).

Chan et al. CpG Island Methylation in Aberrant Crypt Foci of the Colorectum. The American Journal of Pathology 160(5):1823-1830 (May 2002).

Chen et al. Non-Invasive Early Detection of Cancer Four Years before Conventional Diagnosis Using a Blood Test. Nature Communications 11(1):3475 (Dec. 2020).

Chereji et al. Quantitative MNase-Seq Accurately Maps Nucleosome Occupancy Levels. Genome Biology 20(1):198 (Dec. 2019).

Chodavarapu et al. Relationship between Nucleosome Positioning and DNA Methylation. Nature 466(7304):388-392 (2010).

Cleary et al. Detection of low-abundance bacterial strains in metagenomic datasets by eigengenome partitioning. Nat Biotechnol 33(10):1053-60 (2015).

Collin, Francois et al. Detection of Early Stage Pancreatic Cancer Using 5Hydroxymethylcytosine Signatures in Circulating Cell Free DNA. Preprint. Cancer Biology [https://www.biorxiv.org/content/10.1101/422675v2], 1-44 (2018).

Crary-Dooley et al. A Comparison of Existing Global DNA Methylation Assays to Low-Coverage Whole-Genome Bisulfite Sequencing for Epidemiological Studies. Epigenetics 12(3):206-214 (2017).

Crawford et al. Tet2 Catalyzes Stepwise 5-Methylcytosine Oxidation by an Iterative and de Novo Mechanism. Journal of the American Chemical Society 138(3):730-733 (2016).

Cristiano et al. Genome-Wide Cell-Free DNA Fragmentation in Patients with Cancer. Nature 570 (7761):385-389. (Jun. 2019).

Cui et al. A Human Tissue Map of 5-Hydroxymethylcytosines Exhibits Tissue Specificity through Gene and Enhancer Modulation. Nature Communications 11(1):6161 (Dec. 2020).

Dadkhah et al. Gut microbiome identifies risk for colorectal polyps. BMJ Open Gastro 6:e000297 (2019).

Daley et al. Predicting the Molecular Complexity of Sequencing Libraries. Nature Methods 10(4):325-329 (2013).

Dalton et al. DNA Demethylation by TDG. Epigenomics 4(4):459-467 (Aug. 2012):.

De Carvalho et al. DNA Methylation Screening Identifies Driver Epigenetic Events of Cancer Cell Survival. Cancer Cell 21(5):655-667 (May 2012).

De Palma et al. The Molecular Hallmarks of the Serrated Pathway in Colorectal Cancer. Cancer 11:1017 (2019).

Denizio et al. Nucleobase, Nucleoside, And Neighboring Nucleotides: Intrinsic Preferences For Tet Enzyme-Mediated Oxidation of 5-Methylcytosine. [Thesis] Dissertation, University of Pennsylvania [https://repository.upenn.edu/edissertations/3301] 1-130 (2019).

(56) References Cited

OTHER PUBLICATIONS

Denizio et al. Selectivity and Promiscuity in TET-Mediated Oxidation of 5-Methylcytosine in DNA and RNA. Biochemistry 58(5):411-421 (2019).
Denizio et al. TET-TDG Active DNA Demethylation at CpG and Non-CpG Sites. Journal of Molecular Biology 433(8):166877 (Apr. 2021).
Devos et al. Circulating Methylated SEPT9 DNA in Plasma Is a Biomarker for Colorectal Cancer. Clinical Chemistry 55(7):1337-1346 (2009).
Diep et al. Large-Scale Targeted DNA Methylation Analysis Using Bisulfite Padlock Probes. In DNA Methylation Protocols, Methods in Molecular Biology 1708:365-382 (2018).
Ding et al. DectICO: an alignment-free supervised metagenomic classification method based on feature extraction and dynamic selection. BMC Medical Genomics 16:323 (2015).
Ditzler et al. Multi-Layer and Recursive Neural Networks for Metagenomic Classification. IEEE Transactions on Nanobioscience 14(6):608-616 (2015).
Dor et al. Principles of DNA Methylation and Their Implications for Biology and Medicine. The Lancet 392(10149):777-786 (Sep. 2018).
Durso et al. Aberrant Methylation Patterns in Colorectal Cancer: A Meta-Analysis. Oncotarget 8(8):12820-12830 (2017).
Emmett et al. DNA Methylation Patterns in Ulcerative Colitis-Associated Cancer: A Systematic Review. Epigenomics 9(7):1029-1042 (Jul. 2017).
EP Application No. 20815641.4 Extended European Search Report dated Mar. 25, 2022.
Ermakov et al. Ultrashort SsDNA in Retinoblastoma Patients Blood Plasma Detected by a Novel High Resolution HPLC Technique:A Preliminary Report. Acta Medica (Hradec Kralove, Czech Republic) 62(4):170-173 (2019).
Esteller, Manel et al. Epigenetics in Cancer. N Engl J Med 358:1148-1159 (2008).
Fabyanic et al. Quantitative Single Cell 5hmC Sequencing Reveals Non-Canonical Gene Regulation by Non-CG Hydroxymethylation. biRxiv Genomics Preprint https://doi.org/10.1101/2021.03.23.434325; 1-40 (Mar. 2021).
Fadda et al. Colorectal Cancer Early Methylation Alterations Affect the Crosstalk between Cell and Surrounding Environment, Tracing a Biomarker Signature Specific for This Tumor: CRC Early Methylation Impairs Cell Signalling. International Journal of Cancer 143(4):907-920 (Aug. 15, 2018).
Fiedler et al. Genome-wide DNA Methylation Analysis of Colorectal Adenomas with and without Recurrence Reveals an Association between Cytosine-phosphate-guanine Methylation and Histological Subtypes. Genes, Chromosomes and Cancer 58(11):783-797 (Nov. 2019).
Friedland et al. Development and Clinical Validation of a blood test for early detection of colorectal adenomas and cancer. Abstract 32305, Poster ASCO GI Meeting [1-1] (2021).
Frith et al. A Mostly Traditional Approach Improves Alignment of Bisulfite-Converted DNA. Nucleic Acids Research 40(13):e100 (Jul. 1, 2012).
Frommer et al. A genomic sequencing protocol that yields a positive display of 5-methylcytosine residues in individual DNA strands. PNAS USA 89:1827-1831 (1992).
Gajula et al. High-Throughput Mutagenesis Reveals Functional Determinants for DNA Targeting by Activation-Induced Deaminase. Nucleic Acids Research 42(15):9964-9975 (2014).
Gansauge et al. A Method for Single-Stranded Ancient DNA Library Preparation. In Ancient DNA, Methods in Molecular Biology 1963:75-83 (2019).
Gansauge et al. Manual and Automated Preparation of Single-Stranded DNA Libraries for the Sequencing of DNA from Ancient Biological Remains and Other Sources of Highly Degraded DNA. Nature Protocols 15(8):2279-2300 (Aug. 2020).
Gansauge et al. Single-Stranded DNA Library Preparation from Highly Degraded DNA Using T4 DNA Ligase. Nucleic Acids Research 45(10):e79 [1-10] (Jan. 2017).
Gao et al. 5-Hydroxymethylcytosine Profiling from Genomic and Cell-free DNA for Colorectal Cancers Patients. Journal of Cellular and Molecular Medicine 23(5):3530-3537 (May 2019).
Gao et al. SMAP: A Streamlined Methylation Analysis Pipeline for Bisulfite Sequencing. GigaScience 4(1):29 [1-9] (Dec. 2015).
Ghanty et al. Exploiting Substrate Promiscuity to Develop Activity-Based Probes for TET Family Enzymes J. Am. Chem. Soc. 140(50):17329-17332 (2018).
Golub et al. Molecular classification of cancer: Class discovery and class prediction by gene expression monitoring, Science, American Association for the Advancement of Science, 286:5439 (Oct. 15, 1999).
Gopalakrishnan et al. Gut microbiome modulates response to anti-PD-1 immunotherapy in melanoma patients. Science 359(6371):97-103 (2018).
Greco et al. DNA Hydroxymethylation Controls Cardiomyocyte Gene Expression in Development and Hypertrophy. Nature Communications 7(1):12418 (Nov. 2016).
Gross et al. Gene-Body 5-Hydroxymethylation Is Associated with Gene Expression Changes in the Prefrontal Cortex of Depressed Individuals. Translational Psychiatry 7(5):e1119 (May 2017).
Grunau et al. Bisulfite Genomic Sequencing: Systematic Investigation of Critical Experimental Parameters. Nucleic Acids Research 29(13): E65-5 (2001).
Guler et al. Detection of Early Stage Pancreatic Cancer Using 5-Hydroxymethylcytosine Signatures in Circulating Cell Free DNA. Nature Communications 11(1):5270 (Dec. 2020).
Guo et al. DNA Methylation and Chromatin Accessibility Profiling of Mouse and Human Fetal Germ Cells. Cell Research 27(2):165-183 (Feb. 2017).
Guo et al. DNA Methylation of LRRC3B: A Biomarker for Survival of Early-Stage Non-Small Cell Lung Cancer Patients. Cancer Epidemiology Biomarkers & Prevention 27(12):1527-1535 (2018).
Guo et al. Identification of Methylation Haplotype Blocks Aids in Deconvolution of Heterogeneous Tissue Samples and Tumor Tissue-of-Origin Mapping from Plasma DNA. Nature Genetics 49(4):635-642 (2017).
Hanley et al. Genome-Wide DNA Methylation Profiling Reveals Cancer-Associated Changes within Early Colonic Neoplasia. Oncogene 36(35):5035-5044 (2017).
Hao et al. DNA Methylation Markers for Diagnosis and Prognosis of Common Cancers. Proceedings of the National Academy of Sciences 114(28):7414-7419 (2017).
Havel et al. The evolving landscape of biomarkers for checkpoint inhibitor immunotherapy. Nat Rev Cancer 19(3):133-150 (2019).
He et al. Development of a Multiplex MethyLight Assay for the Detection of Multigene Methylation in Human Colorectal Cancer. Cancer Genetics and Cytogenetics 202(1):1-10 (2010).
He et al. Tet-Mediated Formation of 5-Carboxylcytosine and Its Excision by TDG in Mammalian DNA. Science 333(6047):1303-1307 (2011).
Herman, J.G., et al., "Methylation-Specific PCR: A Novel PCR Assay for Methylation Status of CpG Islands." Proceedings of the National Academy of Science USA 93:9821-9826, Sep. 1996.
Hoadley et al. Cell-of-Origin Patterns Dominate the Molecular Classification of 10,000 Tumors from 33 Types of Cancer. Cell 173(2):291-304.e6 (2018).
Holdenrieder et al. Novel Serum Nucleosomics Biomarkers for the Detection of Colorectal Cancer. Anticancer Research 34:2357-2362 (2014).
Holder et al. Machine Learning for Epigenetics and Future Medical Applications. Epigenetics 12(7):505-514 (2017).
Hong et al. Probabilistic Alignment Leads to Improved Accuracy and Read Coverage for Bisulfite Sequencing Data. BMC Bioinformatics 14(1):337 (2013).
Hore et al. Retinol and Ascorbate Drive Erasure of Epigenetic Memory and Enhance Reprogramming to Naïve Pluripotency by Complementary Mechanisms. Proceedings of the National Academy of Sciences 113(43):12202-12207 (2016).
Hu et al. Crystal Structure of TET2-DNA Complex: Insight into TET-Mediated 5mC Oxidation. Cell 155(7):1545-1555 (2013).
Hu et al. Structural Insight into Substrate Preference for TET-Mediated Oxidation. Nature 527(7576):118-122 (2015).

(56) References Cited

OTHER PUBLICATIONS

Huang et al. Analysis of microbial sequences in plasma cell-free DNA for early-onset breast cancer patients and healthy females. BMC Medical Genomics 11(Suppl 1):16 (2018).
Huang et al., The ratio of ssDNA to dsDNA in circulating cell-free DNA extract is a stable indicator for diagnosis of gastric cancer. Pathol Oncol Res. 26(4):2621-2632 (2020).
Hulbert et al. Early Detection of Lung Cancer Using DNA Promoter Hypermethylation in Plasma and Sputum. Clinical Cancer Research 23(8):1998-2005 (2017).
Inoshita et al. Sex Differences of Leukocytes DNA Methylation Adjusted for Estimated Cellular Proportions. Biology of Sex Differences 6(1):11 (2015).
Irizarry et al. The Human Colon Cancer Methylome Shows Similar Hypo- and Hypermethylation at Conserved Tissue-Specific CpG Island Shores. Nature Genetics 41(2):178-186 (2009).
Ito et al. Tet Proteins Can Convert 5-Methylcytosine to 5-Formylcytosine and 5-Carboxylcytosine Science 333(6047):1300-1303 (2011).
Jenkinson et al. Potential Energy Landscapes Identify the Information-Theoretic Nature of the Epigenome. Nature Genetics 49(5):719-729 (2017).
Jiang et al. LINE-1 Is Preferentially Hypomethylated within Adenomatous Polyps in the Presence of Synchronous Colorectal Cancer. Clinical Epigenetics 9(1):25 (2017).
Jin et al. Circulating Methylated DNA as Biomarkers for Cancer Detection In: Methylation—From DNA, RNA and Histones to Diseases and Treatment, Nov. 28, 2012 (Nov. 28, 2012), InTech, XP055479454, ISBN: 978-953-51-0881-8 DOI: 10.5772/51419.
Johnson et al. Age-Related DNA Hydroxymethylation Is Enriched for Gene Expression and Immune System Processes in Human Peripheral Blood. Epigenetics 15(3):294-306 (2020).
Juhling et al. Metilene: Fast and Sensitive Calling of Differentially Methylated Regions from Bisulfite Sequencing Data. Genome Research 26(2):256-262 (2016).
Jung et al. DNA Methylation Analysis of Free-Circulating DNA in Body Fluids. In DNA Methylation Protocols, Methods in Molecular Biology 1708:621-641 (2018).
Kagohara et al. Epigenetic Regulation of Gene Expression in Cancer: Techniques, Resources and Analysis. Briefings in Functional Genomics 2017:1-15 (2017).
Kang et al. CancerLocator: Non-Invasive Cancer Diagnosis and Tissue-of-Origin Prediction Using Methylation Profiles of Cell-Free DNA. Genome Biology 18(1):53 (2017).
Kapp et al. A Fast and Efficient Single-Stranded Genomic Library Preparation Method Optimized for Ancient DNA. Journal of Heredity esab012 (2021).
Kelly et al. Genome-Wide Mapping of Nucleosome Positioning and DNA Methylation within Individual DNA Molecules. Genome Research 22(12):2497-2506 (2012).
Kirschner et al. Multiplexing for Oxidative Bisulfite Sequencing (OxBS-Seq). In DNA Methylation Protocols, Methods in Molecular Biology 1708:665-678 (2018).
Kizaki et al. CGmCGCG Is a Versatile Substrate with Which to Evaluate Tet Protein Activity. Org Biomol Chem. 12(1):104-107 (2014).
Kohli et al. TET Enzymes, TDG and the Dynamics of DNA Demethylation. Nature 502(7472):472-479 (2013).
Kourou et al.: Machine learning applications in cancer prognosis and prediction. Comput Struct Biotechnol J.13:8-17 (2014).
Kowarsky et al. Numerous uncharacterized and highly divergent microbes which colonize humans are revealed by circulating cell-free DNA. PNAS USA 114(36):9623-9628 (2017).
Kulis et al. DNA Methylation and Cancer. Advances in Genetics 70:27-56 (2010).
Kumar et al. The DNA (Cytosine-5) Methyltransferases. Nucleic Acids Research 22(1):1-10 (1994).
Lam et al. DNA Methylation Based Biomarkers in Colorectal Cancer: A Systematic Review. Biochimica et Biophysica Acta (BBA)—Reviews on Cancer 1866(1):106-120 (2016).
Lao et al. Epigenetics and Colorectal Cancer. Nature Reviews Gastroenterology & Hepatology 8(12):686-700 (2011).
Lay et al. Nucleosome Occupancy and Methylome Sequencing (NOMe-Seq). In DNA Methylation Protocols, Methods in Molecular Biology 1708:267-284 (2018).
Lazar et al. Epigenetic Maintenance of Topological Domains in the Highly Rearranged Gibbon Genome. Genome Research 28(7):983-997 (2018).
Leal et al.: Current and Emerging Molecular Tests for Human Papillomavirus-Related Neoplasia in the Genomic Era. J Mol Diagn. 19(3):366-377 doi:10.1016/j.jmoldx.2017.01.006 (2017).
Leontiou, et al. Bisulfite Conversion of DNA: Performance Comparison of Different Kits and Methylation Quantitation of Epigenetic Biomarkers that Have the Potential to Be Used in Non-Invasive Prenatal Testing. PLoS One. Aug. 6, 2015;10(8):e0135058. doi: 10.1371/journal.pone.0135058. eCollection 2015.
Leung et al. Quantitative Detection of Promoter Hypermethylation in Multiple Genes in the Serum of Patients with Colorectal Cancer. Am J Gastroenterol. 100(10):2274-2279 (2005).
Li et al. 5-Hydroxymethylcytosine Signatures in Circulating Cell-Free DNA as Diagnostic Biomarkers for Human Cancers. Cell Research 27(10):1243-1257 (2017).
Li et al. Applying Circulating Tumor DNA Methylation in the Diagnosis of Lung Cancer. Precision Clinical Medicine 2(1):45-56 (2019).
Li et al. CancerDetector: Ultrasensitive and Non-Invasive Cancer Detection at the Resolution of Individual Reads Using Cell-Free DNA Methylation Sequencing Data. Nucleic Acids Research 46(15):e89-e89 (2018).
Li et al. Joint Profiling of DNA Methylation and Chromatin Architecture in Single Cells. Nature Methods 16(10):991-993 (2019).
Li et al. Sensitive Digital Quantification of DNA Methylation in Clinical Samples. Nature Biotechnology 27(9):858-865 (2009).
Li et al. Single-Nucleotide Resolution Analysis of 5-Hydroxymethylcytosine in DNA by Enzyme-Mediated Deamination in Combination with Sequencing. Analytical Chemistry 90(24):14622-14628 (2018).
Li et al. The DNA Methylome of Human Peripheral Blood Mononuclear Cells. Edited by Wolf Reik. PLoS Biology 8(11):e1000533 (2010).
Liao et al. MethGo: A Comprehensive Tool for Analyzing Whole-Genome Bisulfite Sequencing Data. BMC Genomics 16(Suppl 12):S11 (2015).
Libertini et al. Information Recovery from Low Coverage Whole-Genome Bisulfite Sequencing. Nature Communications 7(1):11306 (2016).
Liu et al.: An individualized predictor of health and disease using paired reference and target samples. BMC Bioinformatics 17:47 [1-15] (2016).
Liu et al. Bisulfite-Free Direct Detection of 5-Methylcytosine and 5-Hydroxymethylcytosine at Base Resolution. Nature Biotechnology 37(4):424-429 (2019).
Liu et al. Sensitive and Specific Multi-Cancer Detection and Localization Using Methylation Signatures in Cell-Free DNA. Annals of Oncology 31(6):745-759 (2020).
Liu et al. Targeted Methylation Sequencing of Plasma Cell-Free DNA for Cancer Detection and Classification. Annals of Oncology 29(6):1445-1453 (2018).
Lovkvist et al. Exploring the Link between Nucleosome Occupancy and DNA Methylation. Frontiers in Genetics 8:232 (2018).
Luo et al. Circulating Tumor DNA Methylation Profiles Enable Early Diagnosis, Prognosis Prediction, and Screening for Colorectal Cancer. Science Translational Medicine 12(524):eaax7533 (2020).
Luo et al. Differences in DNA Methylation Signatures Reveal Multiple Pathways of Progression From Adenoma to Colorectal Cancer Gastroenterology 147(2):418-429 (2014).
Luo et al. Single-Cell Methylomes Identify Neuronal Subtypes and Regulatory Elements in Mammalian Cortex. Science 357(6351):600-604 (2017).
Manconi et al. GPU-BSM: A GPU-Based Tool to Map Bisulfite-Treated Reads. Edited by Matteo Pellegrini. PLoS One 9(5):e97277 (2014).

(56) References Cited

OTHER PUBLICATIONS

Manghnani et al.: METCC: METric learning for Confounder Control Making distance matter in high dimensional biological analysis. arXiv:1812.03188v1 [cs.LG] [1-10] (2018).
Mirabella et al. Chromatin Deregulation in Disease. Chromosoma 125(1):75-93 (2016).
Moss et al. Comprehensive Human Cell-Type Methylation Atlas Reveals Origins of Circulating Cell-Free DNA in Health and Disease. Nature Communications 9(1):5068 (2018).
Mouliere et al. Enhanced Detection of Circulating Tumor DNA by Fragment Size Analysis. Science Translational Medicine 10(466):eaat4921 (2018).
Nothjunge et al. DNA Methylation Signatures Follow Preformed Chromatin Compartments in Cardiac Myocytes. Nature Communications 8(1):1667 (2017).
Ogino et al. Precision and Performance Characteristics of Bisulfite Conversion and Real-Time PCR (MethyLight) for Quantitative DNA Methylation Analysis. The Journal of Molecular Diagnostics 8(2):209-217 (2006).
Olkhov-Mitsel et al. Strategies for Discovery and Validation of Methylated and Hydroxymethylated DNA Biomarkers. Cancer Med. 1(2):237-260 (2012).
Olova et al. Comparison of Whole-Genome Bisulfite Sequencing Library Preparation Strategies Identifies Sources of Biases Affecting DNA Methylation Data. Genome Biology 19(1):33 (2018).
PCT/US2020/035380 International Invitation to Pay Additional Fees dated Aug. 21, 2020.
PCT/US2020/035380 International Search Report and Written Opinion dated Oct. 19, 2020.
Pedersen et al. Genome-Wide Nucleosome Map and Cytosine Methylation Levels of an Ancient Human Genome. Genome Research 24(3):454-466 (2014).
Piening et al. Integrative Personal Omics Profiles during Periods of Weight Gain and Loss. Cell Systems 6:1-14 (2018).
Rahier et al. Circulating Nucleosomes as New Blood-Based Biomarkers for Detection of Colorectal Cancer. Clinical Epigenetics 9(1):53 (2017).
Ramachandran et al. Transcription and Remodeling Produce Asymmetrically Unwrapped Nucleosomal Intermediates. Molecular Cell 68(6):1038-1053.e4 (2017).
Rashid et al. CpG Island Methylation in Colorectal Adenomas. The American Journal of Pathology 159(3):1129-1135 (2001).
Rasmussen et al. Hypermethylated DNA, a Circulating Biomarker for Colorectal Cancer Detection. Edited by Jorg Tost. PLOS One 12(7):e0180809 (2017).
Ravichandran: Biochemical characterisation of TET DNA hydroxylases. OPUS—Publication Server of the University of Stuttgart, Doctoral Thesis [1-153] URL: http://dx.doi.org/10.18419/opus-9194 (2017).
Roperch et al. Aberrant Methylation of NPY, PENK, and WIF1 as a Promising Marker for Blood-Based Diagnosis of Colorectal Cancer. BMC Cancer 13:566 (2013).
Sakai et al. Accumulation of Aberrant DNA Methylation during Colorectal Cancer Development. World Journal of Gastroenterology 20(4):978-987 (2014).
Salas et al. An Optimized Library for Reference-Based Deconvolution of Whole-Blood Biospecimens Assayed Using the Illumina HumanMethylationEPIC BeadArray. Genome Biology 19(1):64 (2018).
Salhab et al. A Comprehensive Analysis of 195 DNA Methylomes Reveals Shared and Cell-Specific Features of Partially Methylated Domains. Genome Biology 19(1):150 (Dec. 2018).
Schutsky et al. APOBEC3A Efficiently Deaminates Methylated, but Not TET-Oxidized, Cytosine Bases in DNA. Nucleic Acids Research 45(13):7655-7665 (2017).
Schutsky et al. Nondestructive, Base-Resolution Sequencing of 5-Hydroxymethylcytosine Using a DNA Deaminase. Nature Biotechnology 36(11):1083-1090 (2018).
Shafi et al. A Survey of the Approaches for Identifying Differential Methylation Using Bisulfite Sequencing Data. Briefings in Bioinformatics 19(5):737-753 (2018).
Sheaffer et al. DNA Hypomethylation Contributes to Genomic Instability and Intestinal Cancer Initiation. Cancer Prevention Research 9(7):534-546 (2016).
Shen et al. Characterization of the DNA Methylome and Its Interindividual Variation in Human Peripheral Blood Monocytes. Epigenomics 5(3):255-269 (2013).
Shen et al. Sensitive Tumour Detection and Classification Using Plasma Cell-Free DNA Methylomes. Nature 563(7732):579-583 (2018).
Shi et al. Structural Basis for Targeted DNA Cytosine Deamination and Mutagenesis by APOBEC3A and APOBEC3B. Nature Structural & Molecular Biology 24(2):131-139 (2017).
Simpson et al. Detecting DNA Cytosine Methylation Using Nanopore Sequencing. Nature Methods 14(4):407-410 (2017).
Simpson et al. Detecting DNA Methylation Using the Oxford Nanopore Technologies MinION Sequencer. Preprint. Genomics, Apr. 4, 2016.
Singh, et al. "Gene expression correlates of clinical prostate cancer behavior." Cancer Cell. vol. 1, pp. 203-209 (2002).
Smith et al. Epigenetic Restriction of Extraembryonic Lineages Mirrors the Somatic Transition to Cancer. Nature 549(7673):543-547 (2017).
Snider et al. Region-Specific Glucocorticoid Receptor Promoter Methylation Has Both Positive and Negative Prognostic Value in Patients with Estrogen Receptor-Positive Breast Cancer. Clinical Epigenetics 11(1):155 (2019).
Song et al. 5-Hydroxymethylcytosine Signatures in Cell-Free DNA Provide Information about Tumor Types and Stages. Cell Research 27:1231-1242 (2017).
Song et al. Selective Chemical Labeling Reveals the Genome-Wide Distribution of 5-Hydroxymethylcytosine. Nature Biotechnology 29(1):68-72 (2011).
Spira et al. Precancer Atlas to Drive Precision Prevention Trials. Cancer Res. 77(7):1510-1541 (2017).
Stubbs et al. Multi-Tissue DNA Methylation Age Predictor in Mouse. Genome Biology 18(1):68 (Dec. 2017).
Sun et al. Plasma DNA Tissue Mapping by Genome-Wide Methylation Sequencing for Noninvasive Prenatal, Cancer, and Transplantation Assessments. Proceedings of the National Academy of Sciences 112(40):E5503-E5512 (2015).
Sunami et al. Line-1 Hypomethylation During Primary Colon Cancer Progression. Edited by Chun-Ming Wong. PLoS One 6(4):e18884 (2011).
Tamanaha et al. Distributive Processing by the Iron(II)/α-Ketoglutarate-Dependent Catalytic Domains of the TET Enzymes Is Consistent with Epigenetic Roles for Oxidized 5-Methylcytosine Bases. Journal of the American Chemical Society 138(30):9345-9348 (2016).
Thomson et al. Affinity-Based Enrichment Techniques for the Genome-Wide Analysis of 5-Hydroxymethylcytosine. In DNA Methylation Protocols, Methods in Molecular Biology 1708:679-696 (2018).
Toth et al. The Influence of Methylated Septin 9 Gene on RNA and Protein Level in Colorectal Cancer. Pathology & Oncology Research 17(3):503-509 (2011).
Troll et al. A Ligation-Based Single-Stranded Library Preparation Method to Analyze Cell-Free DNA and Synthetic Oligos. BMC Genomics 20(1):1023 (2019).
Underhill et al. Fragment Length of Circulating Tumor DNA. Edited by David J. Kwiatkowski. PLOS Genetics 12(7):e1006162 (2016).
Vaisvila et al. EM-Seq: Detection of DNA Methylation at Single Base Resolution from Picograms of DNA. bioRxiv Preprint. Genomics, Dec. 23, 2019 [1-27] (2019).
Valo et al. DNA Hypermethylation Appears Early and Shows Increased Frequency with Dysplasia in Lynch Syndrome-Associated Colorectal Adenomas and Carcinomas. Clin Epigenetics 7(1):71 (2015).
Varinli et al. COBRA-Seq: Sensitive and Quantitative Methylome Profiling. Genes (Basel) 6(4):1140-1163 (2015).
Wan et al. Machine learning enables detection of early-stage colorectal cancer by whole-genome sequencing of plasma cell-free DNA. bioRxiv prePrint URL:https://doi.org/10.1101/478065 [1-22] (2018).

(56) References Cited

OTHER PUBLICATIONS

Wang et al. Discovery of an Unnatural DNA Modification Derived from a Natural Secondary Metabolite. Cell Chemical Biology 28(1):97-104.e4 (2021).
Wang et al. Evaluation of antibody level against Fusobacterium nucleatum in the serological diagnosis of colorectal cancer. Scientific reports 6:33440 (2016).
Weisenberger et al. Analysis of Repetitive Element DNA Methylation by MethyLight. Nucleic Acids Research 33(21):6823-6836 (2005).
Weisenberger et al. CpG Island Methylator Phenotype Underlies Sporadic Microsatellite Instability and Is Tightly Associated with BRAF Mutation in Colorectal Cancer. Nature Genetics 38(7):787-793 (2006).
Wen et al. Genome-Scale Detection of Hypermethylated CpG Islands in Circulating Cell-Free DNA of Hepatocellular Carcinoma Patients. Cell Research 25(11):1250-1264 (2015).
Wernig-Zorc et al. Global Distribution of DNA Hydroxymethylation and DNA Methylation in Chronic Lymphocytic Leukemia. Epigenetics & Chromatin 12(1):4 (2019).
Widschwendter et al. Association of Breast Cancer DNA Methylation Profiles with Hormone Receptor Status and Response to Tamoxifen. Cancer Research 64(11):3807-3813 (2004).
Wiehle et al. DNA (de)Methylation in Embryonic Stem Cells Controls CTCF-Dependent Chromatin Boundaries. Genome Research 29(5):750-761 (2019).
Worm Orntoft et al. Comparative Analysis of 12 Different Kits for Bisulfite Conversion of Circulating Cell-Free DNA. Epigenetics 12(8):626-636 (2017).
Xu et al. Circulating Tumour DNA Methylation Markers for Diagnosis and Prognosis of Hepatocellular Carcinoma. Nature Materials 16(11):1155-1161 (2017).
Xu et al. Nascent DNA Methylome Mapping Reveals Inheritance of Hemimethylation at CTCF/Cohesin Sites. Science 359(6380):1166-1170 (2018).
Yin et al. Ascorbic Acid Enhances Tet-Mediated 5-Methylcytosine Oxidation and Promotes DNA Demethylation in Mammals. Journal of the American Chemical Society 135(28):10396-10403 (2013).
Yong et al. Profiling genome-wide DNA methylation. Epigenetics & Chromatin 9(1):26 https://doi.org/10.1186/s13072-016-0075-3 (2016).
Young et al. Epigenetic Differences between Monozygotic Twins Discordant for Amyotrophic Lateral Sclerosis (ALS) Provide Clues to Disease Pathogenesis. Edited by Cristina Cereda. PLOS One 12(8):e0182638 (2017).
Yu et al. Base-Resolution Analysis of 5-Hydroxymethylcytosine in the Mammalian Genome. Cell 149(6):1368-1380 (2012).
Yu et al.: Tet-assisted bisulfite sequencing of 5-hydroxymethylcytosine. Nat Protoc. 7(12):2159-2170 doi:10.1038/nprot.2012.137 (2012).
Zeng et al. Bisulfite-Free, Nanoscale Analysis of 5-Hydroxymethylcytosine at Single Base Resolution. Journal of the American Chemical Society 140(41):13190-13194 (2018).
Zhang et al. Identification of low abundance microbiome in clinical samples using whole genome sequencing. Genome Biology 16:265 (2015).
Zhang et al. Significant Differences in Global Genomic DNA Methylation by Gender and Race/Ethnicity in Peripheral Blood. Epigenetics 6(5):623-629 (2011).
Zhang et al. Tet-mediated covalent labelling of 5-methylcytosine for its genome-wide detection and sequencing, Nat Commun. 2013;4:1517.
Zhong et al. DNA Methylation-Linked Chromatin Accessibility Affects Genomic Architecture in *Arabidopsis*. Proceedings of the National Academy of Sciences 118(5):e2023347118 (2021).
Zhou et al. Comprehensive Characterization, Annotation and Innovative Use of Infinium DNA Methylation BeadChip Probes. Nucleic Acids Research 45(4):e22 [1-12] (2017).
Zhu et al. Advantages of Single-Stranded DNA Over Double-Stranded DNA Library Preparation for Capturing Cell-Free Tumor DNA in Plasma. Molecular Diagnosis & Therapy 24(1):95-101 (2020).
Zhu et al. Predictors of Global Methylation Levels in Blood DNA of Healthy Subjects:A Combined Analysis. International Journal of Epidemiology 41(1):126-139 (2012).
Ziller et al. Coverage Recommendations for Methylation Analysis by Whole-Genome Bisulfite Sequencing. Nature Methods 12(3):230-232 (2015).
Kozich et al. Development of a dual-index sequencing strategy and curation pipeline for analyzing amplicon sequence data on the MiSeq Illumina sequencing platform. Appl Environ Microbiol 79(17):5112-5120 (2013).
U.S. Appl. No. 17/173,770 Office Action dated Apr. 12, 2024.
Unknown, SureSelectXT Methyl-Seq Target Enrichment System for Illumina Multiplexed Sequencing Protocol. Agilent Technologies. 81 pages, (2018). Citation is not enclosed due to copyright restrictions. Available at https://www.agilent.com/cs/library/usermanuals/public/G7530-90002.pdf.
Unknown, Whole-genome Bisulfite Sequencing for Methylation Analysis Preparing Samples for the Illumina Sequencing Platform. Part # 15021861 Rev. B. 21 pages (2019). Available at https://support.illumina.com/content/dam/illumina-support/documents/documentation/chemistry_documentation/samplepreps_legacy/WGBS_for_Methylation_Analysis_Guide_15021861_B.pdf.
Wendt et al., Targeted Bisulfite Sequencing Using the SeqCap EPI Enrichment System. Methods Mol Biol. 1708:383-405 (2018).
JP2021511648 Office Action dated Apr. 30, 2024.
Kozich, James J., et al. Development of a dual-index sequencing strategy and curation pipeline for analyzing amplicon sequence data on the MiSeq Illumina sequencing platform. Applied and environmental microbiology 79.17: 5112-5120. (2013).
Liu, Yibin, et al. Bisulfite-free direct detection of 5-methylcytosine and 5-hydroxymethylcytosine at base resolution. Nature biotechnology 37.4: 424-429. (2019).
PCT/US2020/035380 International Preliminary Report on Patentability dated Nov. 16, 2021.
N.Z. Serial No. 773619 Examination Report dated Aug. 7, 2024.
U.S. Appl. No. 17/173,770 Office Action dated Oct. 31, 2024.

* cited by examiner

A  SEQ ID NO. 14   5'-TGAGG\
                                   AATGAGCACGTACTAACC*T
                                   ||||||||||||||||||
                                   TTACTCGTGCATGATTGG-p
SEQ ID NO. 15   3'-GTGAGATAG/

B                   Forward PCR Primer
SEQ ID NO. 16   5'-CACTCTATCAATAAACACATACT-3'
                   |||||||||||||||||||||||
SEQ ID NO. 17   3'-GTGAGATAGTTA<u>U</u>T<u>U</u>GTG<u>U</u>ATGATTGG...
                      Converted Ligated Adapter

FIG. 4

METHODS AND SYSTEMS FOR HIGH-DEPTH SEQUENCING OF METHYLATED NUCLEIC ACID

CROSS-REFERENCE

This application is a continuation of U.S. Utility application Ser. No. 17/173,770, filed Feb. 11, 2021, which is a continuation of International Application No. PCT/US2020/035380, filed May 29, 2020, which claims the benefit of U.S. Provisional Application No. 62/855,795, filed May 31, 2019, each of which is incorporated herein by reference in its entirety.

SEQUENCE LISTING

The instant application contains a Sequence Listing which has been submitted electronically in XML format and is hereby incorporated by reference in its entirety. Said XML copy, created on Mar. 2, 2023, is named 49407-740_302_SL.xml and is 23,133 bytes in size.

INCORPORATION BY REFERENCE

All publications, patents, and patent applications mentioned in the specification, including the examples, are hereby incorporated by reference in their entirety as if each individual publication, patent or patent application was specifically and individually indicated to be incorporated by reference. In case of conflict, the present application, including any definitions herein, will control.

BACKGROUND

Due to the stability of DNA and DNA's role in normal differentiation and diseases such as cancer, DNA methylation can represent tumor characteristics and phenotypic states, and therefore, has high potential for use in personalized medicine. Aberrant DNA methylation patterns occur early in the pathogenesis of cancer, and can therefore facilitate early cancer detection. In fact, DNA methylation abnormalities are one of the hallmarks of cancer and are associated with all aspects of cancer, from tumor initiation to cancer progression and metastasis. These properties inspired a number of recent approaches in using DNA methylation patterns for cancer diagnosis. In particular, cell-free DNA (cfDNA) is fragmented DNA present in the circulation and the fragmentation patterns are useful and informative as a biological signal. In contrast, genomic DNA is artificially fragmented in vitro for use in library preparation, so the fragmentation patterns of genomic DNA are not as important for diagnostic methods.

DNA methylation is a covalent modification of DNA and a stable inherited mark that can play an important role in repressing gene expression and regulating chromatin architecture. In humans, DNA methylation primarily occurs at cytosine residues in CpG dinucleotides. Unlike other dinucleotides, CpGs are not evenly distributed across the genome and can be concentrated in short CpG-rich DNA regions called CpG islands. In general, the majority of the CpG sites in the genome are ~70-75% methylated. However, methylation patterns differ from cell type to cell type, reflecting their role in regulating cell type-specific gene expression. In this manner, a cell's methylome can program the cell's terminal differentiation state to be, for instance, a neuron, a muscle cell, an immune cell, etc.

Further, various cell sub-types in a tissue can exhibit different methylation patterns. In cancer cells, CpG methylation can be deregulated, and aberrations in methylation patterns are some of the earliest events that occur in tumorigenesis. Methylation profiles in a given cancer type most closely resemble that of the tissue of origin of the cancer. Thus, aberrant methylation marks on a cfDNA fragment can be used to differentiate a cancer cell from a normal cell, and determine tissue type origin. In general, global CpG methylation levels decrease in cancer cells, but at specific loci, mean methylation levels (or % methylation) can vary at a specific CpG sites in cancer cells relative to matched normal cells. Profiling differentially methylated CpGs (DMCs; single sites) or regions (DMRs; more than one site in a localized region) between normal and diseased cells allows identification of biomarkers of the disease. Such approach has led to development of the SEPT9 gene methylation assay (Epi proColon), which is the first FDA-approved blood-based diagnostic for colorectal cancer (CRC).

Bisulfite conversion or bisulfite sequencing has become a widely used method for DNA methylation analysis. Bisulfite sequencing is a convenient and effective method of mapping DNA methylation to individual bases. Unfortunately, bisulfite conversion is a harsh and destructive process for cfDNA that leads to degradation of >90% of the sample DNA. Two main approaches to constructing bisulfite sequencing libraries are: (1) bisulfite conversion of the DNA before library construction, which necessitates building single-stranded DNA libraries; and (2) bisulfite conversion of DNA after double-stranded adapter ligation. Either case involves severe degradation of DNA, which can be problematic especially for cfDNA that is present at very low concentrations in plasma and is the limiting resource in liquid biopsy applications. In ssDNA libraries, some degraded cfDNA can be retained in the library, but endpoint information on the degraded fragments is lost. Such libraries limit the ability to use cfDNA endpoints or fragment length information to study DNA methylation. In dsDNA libraries, cfDNA inserts cleaved by bisulfite are lost from the library, but for the surviving cfDNA inserts, endpoint information is retained. This necessitates prohibitively large blood collection volumes to achieve high-depth unique coverage of the genome, or limits performing analysis only at low-depth unique coverage.

The advent of next generation DNA sequencing offers advances in clinical medicine and basic research. However, while this technology has the capacity to generate hundreds of billions of nucleotides of DNA sequence in a single experiment, the error rate of approximately 1% results in hundreds of millions of sequencing mistakes. Such errors can be tolerated in some applications but become extremely problematic for "deep sequencing" of genetically heterogeneous mixtures, such as tumors or mixed microbial populations.

With existing methods, analyzing variants in cfDNA and methylation state in cfDNA requires two different sequencing assays and two different pools of cfDNA. This can be cost-prohibitive in terms of plasma/cfDNA input and associated costs. In addition, destruction of DNA by bisulfite can reduce the sensitivity of variant-calling methods that can work on bisulfite-converted DNA sequencing data (relative to enzymatic conversion). Thus, improved methods for analyzing methylation of cfDNA are needed to preserve the integrity of sample nucleic acid and enable improved accuracy of methylation state analysis at the whole genome or targeted level.

SUMMARY

Methods and systems provided herein address limitations of bisulfite-based methylation sequencing by improving the quality and accuracy of nucleic acid methylation sequencing and uses thereof for detection of disease. More accurate and complete information regarding methylation state permits higher quality feature generation for use in machine learning models and classifier generation.

In a first aspect, a method is provided for performing methylation sequencing of a nucleic acid sample comprising:
- a) ligating a nucleic acid adapter comprising a unique molecular identifier to the nucleic acid molecule, wherein the nucleic acid molecule comprises unconverted nucleic acids;
- b) converting unmethylated cytosines to uracils in the nucleic acid molecule using a minimally-destructive conversion method, thereby generating converted nucleic acids;
- c) amplifying the converted nucleic acids by polymerase chain reaction, thereby generating amplified converted nucleic acids;
- d) probing the amplified converted nucleic acids with nucleic acid probes that are complementary to a pre-identified panel of CpG or CH loci to enrich for sequences corresponding to the panel, thereby generating probed converted nucleic acids;
- e) determining the nucleic acid sequence of the probed converted nucleic acids at a depth of >100×; and
- f) comparing the nucleic acid sequence of the probed converted nucleic acids to a reference nucleic acid sequence of the pre-identified panel of CpG or CH loci to determine the methylation profile of the nucleic acid molecule of the biological sample.

In one embodiment, the nucleic acid molecule is plasma cfDNA.

In one embodiment, the minimally-destructive conversion method comprises enzymatic conversion, TAPS, or CAPS.

In one embodiment, the unique molecular identifier is 4 bp to 6 bp in length and has a 5' thymidine overhang.

In one embodiment, the nucleic acid adapter further comprises a unique dual index (UDI) sequence. In one embodiment, the UDI sequence is 4 bp, 5 bp, 6 bp, 7 bp, 8 bp, 9 bp, 10 bp, 11 bp, or 12 bp in length.

In one embodiment, the amplifying of the converted nucleic acids comprises using primers that contain a unique dual index (UDI) sequence. In one embodiment, the UDI sequence is 4 bp, 5 bp, 6 bp, 7 bp, 8 bp, 9 bp, 10 bp, 11 bp, or 12 bp in length.

In one embodiment, the nucleic acid adapter is a conversion-tolerant adapter comprising guanine, thymine, adenine, and cytosine bases, and not comprising 5 mC-containing bases or 5 hmC-containing bases.

In one embodiment, the nucleic acid probes are unmethylated nucleic acid probes.

In one embodiment, the nucleic acid probes hybridize to target regions of interest that are consistent with unmethylated cytosines at CpG sites in the reference nucleic acid sequence.

In one embodiment, the nucleic acid probes comprise the target regions of interest that are consistent with methylated cytosines at CpG sites in the reference nucleic acid sequence.

In one embodiment, the nucleic acid probes are mixtures of chemically or enzymatically altered methylated or unmethylated nucleic acid probes.

In one embodiment, one or more cytosines in CG contexts of the probed converted nucleic acids are converted to thymines, and all cytosines in CH contexts of the probed converted nucleic acids are converted to thymines.

In one embodiment, the conversion of unmethylated cytosines to uracils comprises sequential TET/APOBEC enzymatic conversion.

In one embodiment, the conversion of unmethylated cytosines to uracils comprises TAPS.

In a second aspect, a method is provided for determining a targeted methylation pattern in a nucleic acid molecule of a biological sample from a subject comprising:
- a) ligating a nucleic acid adapter comprising a unique molecular identifier to the cfDNA, wherein the cfDNA comprises unconverted nucleic acids;
- b) enzymatically converting unmethylated cytosines to uracils in nucleic acid molecules to produce converted nucleic acids;
- c) amplifying the converted nucleic acids by polymerase chain reaction;
- d) probing the converted nucleic acids with nucleic acid probes that are complementary to a pre-identified panel of CpG or CH loci to enrich for sequences corresponding to the pre-identified panel of CpG or CH loci;
- e) determining the nucleic acid sequence of the converted nucleic acids at a depth of >100×; and
- f) comparing the nucleic acid sequence of the converted nucleic acids to a reference nucleic acid sequence of the pre-identified panel of CpG or CH loci to determine the methylation profile of the cell-free DNA (cfDNA) sample from the subject.

In one embodiment, the determining of the nucleic acid sequence of the converted nucleic acids comprises duplex-like error correction.

In one embodiment, the nucleic acid adapter is a conversion-tolerant adapter comprising guanine, thymine, adenine and cytosine bases, and not comprising 5 mC-containing or 5 hmC-containing bases.

In one embodiment, the pre-identified panel of CpG or CH loci comprises loci associated with transcription factor start sites.

In one embodiment, the targeted methylation pattern comprises hemi-methylated CpG loci.

In a third aspect, a method is provided for determining a methylation profile of a cell-free DNA (cfDNA) sample from a subject comprising:
- a) ligating a nucleic acid adapter comprising a unique molecular identifier to the cfDNA, wherein the cfDNA comprises unconverted nucleic acids;
- b) enzymatically converting unmethylated cytosines to uracils in nucleic acid molecules to produce converted nucleic acids;
- c) amplifying the converted nucleic acids by polymerase chain reaction;
- d) probing the converted nucleic acids with nucleic acid probes that are complementary to a pre-identified panel of CpG or CH loci to enrich for sequences corresponding to the pre-identified panel of CpG or CH loci;
- e) determining the nucleic acid sequence of the converted nucleic acids at a depth of >100×; and
- f) comparing the nucleic acid sequence of the converted nucleic acids to a reference nucleic acid sequence of the pre-identified panel of CpG or CH loci to determine the methylation profile of the cell-free DNA (cfDNA) sample from the subject.

In one embodiment, the nucleic acid adapter is a conversion-tolerant adapter comprising guanine, thymine, adenine, and cytosine bases, and not comprising 5 mC-containing or 5 hmC-containing bases.

In one embodiment, the unique molecular identifier is 4 bp to 6 bp in length and has a 5' thymidine overhang.

In one embodiment, the nucleic acid adapter further comprises a unique dual index (UDI) sequence. In one embodiment, the UDI sequence is 4 bp, 5 bp, 6 bp, 7 bp, 8 bp, 9 bp, 10 bp, 11 bp, or 12 bp in length.

In one embodiment, the method further comprises identifying a tissue-of-origin of the cfDNA sample, identifying a somatic variant in the cfDNA sample, inferring nucleosome positioning in the cfDNA sample, identifying differentially methylated regions in the cfDNA sample, or identifying a haplotype block in the cfDNA sample.

Further provided herein is a method of methylation sequencing by duplex sequencing. Duplex sequencing is a tag-based error correction method that can improve sequencing accuracy, for example, methylation sequencing accuracy. In this method, adapters are ligated onto a nucleic acid template and amplified using PCR. In one embodiment, the adapters comprise primer sequences and random 12 bp indices. Deep sequencing provides consensus sequence information from every unique molecular tag. Based on molecular tags and sequencing primers, duplex sequences can be aligned to determine the true sequence of the DNA. Advantages of duplex sequencing include very low error rate and detection and removal of PCR amplification errors. In duplex sequencing, there is also no need for additional library preparation steps after the addition of adapters.

In one embodiment, a method of methylation sequencing of a nucleic acid molecule of a biological sample comprising:
  a) preparing a methylation sequencing library from cfDNA fragments of the nucleic acid molecule comprising:
    i) ligating a duplex adapter to the cfDNA fragments;
    ii) ligating a duplex unique molecular identifier to the cfDNA fragments; and
    iii) converting unmethylated cytosines to uracils in the cfDNA fragments using a minimally-destructive conversion method, thereby preparing the methylation sequencing library from the cfDNA of the nucleic acid molecule;
  b) enriching the methylation sequencing library for sequences corresponding to CpG or CH loci, thereby producing an enriched methylation sequencing library;
  c) sequencing the enriched methylation sequencing library at a depth of >100× using single-end or paired-end reads, thereby producing sequenced fragments of single-end or paired-end reads;
  d) for each sequenced fragment of the paired-end reads, correcting a sequencing error that falls within an overlap region of the paired-end reads;
  e) collapsing sequenced fragments into stranded read families to correct errors arising from PCR and sequencing; and
  f) collapsing the stranded read families into duplex read families to identify a methylation discrepancy in an inferred methylation state of symmetric CpG loci in the nucleic acid molecule.

In one embodiment, the minimally-destructive conversion comprises enzymatic conversion, TAPS, or CAPS.

In a fourth aspect, a method is provided for producing a classifier comprising:
  a) ligating a nucleic acid adapter comprising a unique molecular identifier to a nucleic acid molecule of a biological sample obtained from healthy subjects and biological samples from subjects having a cancer;
  b) converting unmethylated cytosines to uracils in the nucleic acid molecule using a minimally-destructive conversion method, thereby generating converted nucleic acids;
  c) amplifying the converted nucleic acids with polymerase chain reaction, thereby generating amplified converted nucleic acids;
  d) probing the amplified converted nucleic acids with nucleic acid probes that are complementary to a pre-identified panel of CpG or CH loci to enrich for sequences corresponding to the panel, thereby generating probed converted nucleic acids;
  e) determining the nucleic acid sequence of the probed converted nucleic acids at a depth of >100×;
  f) comparing the nucleic acid sequence of the probed converted nucleic acids to a reference nucleic acid sequence of the pre-identified panel of CpG or CH loci to obtain sets of measured values of input features that are representative of methylation profiles from the healthy subjects and from the subjects having the cancer; and
  g) training a machine learning model to produce the classifier that distinguishes between the healthy subjects and the subjects having the cancer.

In one embodiment, the pre-identified panel of CpG or CH loci comprises loci associated with transcription start sites.

In one embodiment, the method further comprises determining hemi-methylated CpG or CH loci.

In one embodiment, the method further comprises identifying a tissue-of-origin for the nucleic acid molecule.

In one embodiment, the method further comprises identifying genomic position and fragment length for the nucleic acid molecule.

In one embodiment, the unique molecular identifier is 4 bp to 6 bp in length and has a 5' thymidine overhang.

In one embodiment, the nucleic acid adapter further comprises a unique dual index (UDI) sequence. In one embodiment, the UDI sequence is 4 bp, 5 bp, 6 bp, 7 bp, 8 bp, 9 bp, 10 bp, 11 bp, or 12 bp in length.

In one embodiment, the amplifying of the converted nucleic acids comprises using primers that contain a unique dual index (UDI) sequence. In one embodiment, the UDI sequence is 4 bp, 5 bp, 6 bp, 7 bp, 8 bp, 9 bp, 10 bp, 11 bp, or 12 bp in length.

In one embodiment, the input features are selected from base wise methylation % for CpG, base wise methylation % for CHG, base wise methylation % for CHH, the count or rate of observing fragments with different counts or rates of methylated CpGs in a region, conversion efficiency (e.g., 100-Mean methylation % for CHH), hypomethylated blocks, methylation levels for CPG, methylation levels for CHH, methylation levels for CHG, fragment length, fragment midpoint, methylation levels for chrM, methylation levels for LINE1, methylation levels for ALU, dinucleotide coverage (e.g., normalized coverage of dinucleotide), evenness of coverage (e.g., unique CpG sites at 1× and 10× mean genomic coverage (e.g., for S4 runs)), mean CpG coverage (e.g., depth) globally, and mean coverage at CpG islands, CGI shelves, and CGI shores.

In a fifth aspect, a classifier is provided that distinguishes a population of healthy individuals from individuals with a cancer comprising: sets of measured values representative of methylation profiles from methylation sequencing data from healthy subjects and subjects having the cancer, wherein the measured values are used to generate a set of features corresponding to properties of the methylation profiles, wherein the set of features are inputted to a machine learning or statistical model, wherein the model provides a feature vector useful as a classifier that distinguishes the population of healthy individuals from individuals having the cancer.

In a sixth aspect, a method is provided for detecting cancer in a population of subjects comprising:
   a) assaying by using targeted minimally-destructive conversion methyl sequencing nucleic acids of a biological sample from a subject to obtain a methylation profile of the nucleic acids;
   b) classifying the biological sample by inputting the methylation profile to a trained algorithm that classifies samples from healthy subjects and subjects having the cancer; and
   c) outputting a report on a computer screen that identifies the biological sample as negative for the cancer if the trained algorithm classifies the biological sample as negative for the cancer at a specified confidence level.

In one example, the cancer is colorectal cancer.

In a seventh aspect, the present disclosure provides a system for classifying individuals based on methylation state comprising:
   a) a computer readable medium product comprising a classifier, wherein the classifier comprises: sets of measured values representative of methylation profiles from methylation sequencing data from healthy subjects and subjects having a cancer, wherein the measured values are used to generate a set of features corresponding to properties of the methylation profiles from healthy subjects and subjects having the cancer, wherein the features are inputted to a machine learning or statistical model, wherein the model provides a feature vector useful as a classifier that distinguishes a population of healthy individuals from individuals having the cancer; and
   b) one or more processors for executing instructions stored on the computer readable medium product.

In one example, the system comprises a classification circuit that is configured as a machine learning classifier selected from a linear discriminant analysis (LDA) classifier, a quadratic discriminant analysis (QDA) classifier, a support vector machine (SVM) classifier, a random forest (RF) classifier, a linear kernel support vector machine classifier, a first order polynomial kernel support vector machine classifier, a second order polynomial kernel support vector machine classifier, a ridge regression classifier, an elastic net algorithm classifier, a sequential minimal optimization algorithm classifier, a naive Bayes algorithm classifier, and a non-negative matrix factorization (NMF) predictor algorithm classifier.

In one embodiment, the system comprises means for performing any of the above methods.

In one embodiment, the system comprises one or more processors configured to perform any of the above methods.

In one embodiment, the system comprises modules that respectively perform the steps of any of the above methods.

In another aspect, the present disclosure provides a method for monitoring minimal residual disease status in a subject previously treated for a disease comprising: determining a methylation profile as described herein as a baseline methylation state and repeating an analysis to determine the methylation profile at one or more pre-determined time points, wherein a change from baseline indicates a change in the minimal residual disease status at baseline in the subject.

In another aspect, the present disclosure provides a method for monitoring minimal residual disease status in a subject previously treated for a disease comprising:
   a) determining a baseline methylation profile of a biological sample obtained from the subject at a baseline methylation state;
   b) determining a test methylation profile of a biological sample obtained from the subject at one or more pre-determined time points following the baseline methylation state; and
   c) determining a change in the test methylation profile as compared to the baseline methylation profile, wherein the change indicates a change in the minimal residual disease status of the subject.

In some embodiments, the disease is a cancer. In some embodiments, the disease is a colorectal cancer.

In another aspect, the present disclosure provides a method for monitoring minimal residual disease status in a subject previously treated for a colorectal cancer comprising: detecting a methylated fragment in a biological sample from the subject, wherein the methylated fragment in the biological sample indicates a change in the minimal residual disease status at baseline for the colorectal cancer in the subject.

In some embodiments, the minimal residual disease status is selected from response to treatment, tumor load, residual tumor post-surgery, relapse, secondary screen, primary screen, and cancer progression.

In another aspect, a method is provided for determining response to treatment for a subject.

In another aspect, a method is provided for monitoring tumor load in a subject.

In another aspect, a method is provided for detecting residual tumor post-surgery in a subject.

In another aspect, a method is provided for detecting relapse in a subject.

In another aspect, a method is provided for use as a secondary screen of a subject.

In another aspect, a method is provided for use as a primary screen of a subject.

In another aspect, a method is provided for monitoring cancer progression in a subject.

In another aspect, the present disclosure provides a kit for detecting a tumor comprising reagents for carrying out the aforementioned methods, and instructions for detecting tumor signals, for example, methylation signatures. Reagents may include, for example, primer sets, PCR reaction components, sequencing reagents, minimally-destructive conversion reagents, and library preparation reagents.

BRIEF DESCRIPTION OF DRAWINGS

FIG. 4, PANEL A provides a schematic showing an example of a conversion-tolerant adapter and comprises SEQ ID NO. 14 and SEQ ID NO. 15. PANEL B provides corresponding sequencing primers that match the converted adapter sequence fully base paired with a compatible PCR primer and comprises SEQ ID NO. 16 and SEQ ID NO. 17. FIG. 4 discloses SEQ ID NOs: 14-17, respectively, in order of appearance.

DETAILED DESCRIPTION

Figure 1:
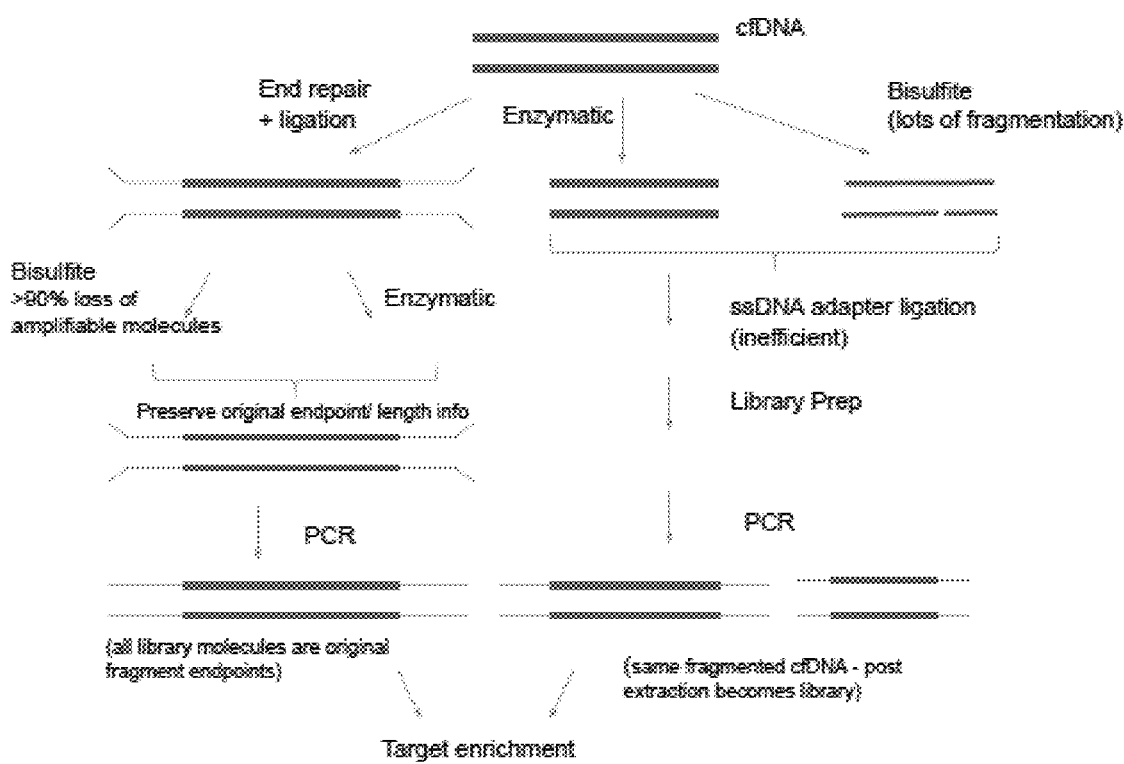
FIG. 1 provides a flow diagram showing conventional methyl bisulfite conversion and degradation compared to the modified methods that preserve fragment length information as described herein.

Provided herein are methods that enable improved library preparation and sequencing of methylated regions for methylation profiling of cfDNA. The methods address limitations of conventional methylation sequencing and profiling of nucleic acids in a biological sample by improving the coverage, uniformity of coverage, resolution, and accuracy of methylation data to support practical applications. The resulting sequencing data obtained from methods provided herein are useful for practical applications that use methylation profiling data for classifying or stratifying a population of individuals. Such classifying or stratifying of a population of individuals may include identifying individuals having a disease, staging disease progression, or responding to a particular treatment for a disease.

I. Definitions

As used herein, singular terms, e.g., "a", "an", and "the" include both singular and plural referents unless the context clearly dictates otherwise.

The term "plasma cell-free DNA", "circulating free DNA", "cell-free DNA", or "cfDNA" may refer to DNA molecules that circulate in the acellular portion of blood. Circulating nucleic acids in blood arise from necrotic or apoptotic cells and greatly elevated levels of nucleic acids from apoptosis is observed in diseases such as cancer. In cancer, circulating DNA bears hallmark signs of the disease, including mutations in oncogenes and microsatellite alterations. These circulating DNA may be referred to as circulating tumor DNA (ctDNA). Viral genomic sequences, DNA, or RNA in plasma is a potential biomarker for disease.

In some embodiments, the cell-free fraction of blood is preferably blood serum or blood plasma. The term "cell-free fraction" of a biological sample used herein refers to a fraction of the biological sample that is substantially free of cells. As used herein, the term "substantially free of cells" may refer to a preparation from the biological sample comprising fewer than about 20,000 cells per ml, fewer than about 2,000 cells per ml, fewer than about 200 cells per ml, or fewer than about 20 cells per ml. Genomic DNA (gDNA) refers to non-fragmented DNA that is released from white blood cells contaminating the blood cell-free fraction. To mitigate gDNA contaminating samples, a highly control sample processing workflow may be implemented and specimens may be screened against the presence of gDNA.

As used herein, the term "diagnose" or "diagnosis" of a status or outcome includes predicting or diagnosing the status or outcome, determining predisposition to a status or outcome, monitoring treatment of patient, diagnosing a therapeutic response of a patient, prognosis of status or outcome, progression, and response to particular treatment.

As used herein, the term "location" refers to the position of a nucleotide in an identified strand in a nucleic acid molecule.

As used herein, the term "nucleic acid" refers to a DNA, RNA, DNA/RNA chimera or hybrid that may be single-strand (ss) or double-strand (ds). Nucleic acids may be genomic or derived from the genome of a eukaryotic or prokaryotic cell, or synthetic, cloned, amplified, or reverse transcribed. In certain embodiments of the methods and compositions, nucleic acid preferably refers to genomic DNA as the context requires.

As used herein, unless otherwise stated, the term "modified cytosine" refers to 5-methylcytosine (5 mC), 5-hydroxymethylcytosine (5 hmC), formyl modified cytosine, carboxy modified cytosine, 5-carboxylcytosine (5 caC), or a cytosine modified by any other chemical group.

As used herein, the term "methylcytosine dioxygenase", "dioxygenase", or "oxygenase refers to an enzyme that converts 5 mC to 5 hmC. Non-limiting examples of methylcytosine dioxygenases include TET1, TET2, TET3, and Naeglaria TET.-TET2 is an example of a methylcytosine dioxygenase that oxidizes at least 90%, at least 92%, at least 94%, at least 96%, at least 98%, or at least 99% of all 5 mC.

As used herein, the term "conversion-tolerant adapter" or "conversion-tolerant primer" refers to nucleic acid molecules used as adapters or primers, respectively. Instead of incorporating modified nucleotide bases to prevent base conversion, conversion-tolerant adapters or conversion-tolerant primers incorporate only unmodified bases to permit total base conversion during a conversion reaction for methylation sequencing. "Unmodified bases" in adapter/primer DNA sequences refer to conventional guanine, adenine, cytosine, and thymine.

As used herein, the term "cytidine deaminase" refers to an enzyme that deaminates cytosine (C) to form uracil (U). Non-limiting examples of cytidine deaminases include the APOBEC family of cytidine deaminases, such as APOBEC3A. In any embodiment, a cytidine deaminase described herein may have an amino acid sequence that is at least 90% identical to (e.g., at least 95% identical to) the amino acid sequence of GenBank accession number AKE33285.1, which is the sequence of human APOBEC3A. In some embodiments, a cytidine deaminase described herein converts unmodified cytosine to uracil with an efficiency of at least 95%, 98% or 99%, preferably at least 99%.

As used herein, the term "glucosyltransferase" or "GT" refers to an enzyme that catalyzes the transfer of a beta-D-glucosyl or alpha-D-glucosyl residue from UDP-glucose to 5 hmC residue to form 5 ghmC. APOBEC can convert 5 hmC to U at a low rate relative to converting C or 5 mC to U. An example of a GT is T4-betaGT (βGT). In one example, GT may be used concurrently with a dioxygenase. This combination ensures that deamination of 5 hmC is blocked such that less than 5%, less than 3%, or less than 1% of 5 hmC is converted to U by the deaminase. In another example, GT may be used together with dioxygenase in the same reaction mix with DNA such that the dioxygenase converts 5 mC to 5 hmC and 5 caC, and the GT converts any residual 5 hmC to 5 ghmC to ensure only cytosine is deaminated.

As used herein, "a portion" of a nucleic acid sample and "an aliquot" of a nucleic acid sample are intended to mean the same and can be used interchangeably.

As used herein, the term "comparing" refers to analyzing two or more sequences relative to one another. In some cases, comparing may be performed by aligning two or more sequences with one another such that correspondingly positioned nucleotides are aligned with one another.

As used herein, the term "reference sequence" refers to the sequence of a fragment that is being analyzed. A reference sequence may be obtained from a public database or may be separately sequenced as part of an experiment. In some cases, the reference sequence may be hypothetical such that the reference sequence may be computationally deaminated (i.e., to change Cs into Us or Ts etc.) to allow a sequence comparison to be made.

As used herein, the terms "G", "A", "T", "U", "C", "5 mC", "5 fC", "c5aC", "5 hmC", and "5 ghmC" refer to nucleotides that contain guanidine (G), adenine (A), thymine (T), uracil (U), cytosine (C), 5-methylcytosine, 5-formylcytosine, 5-carboxylcytosine (5 caC), 5-hydroxymethylcytosine, and 5-glucosylhydroxymethylcytosine, respectively. For clarity, each of C, 5 fC, 5 caC, 5 mC, and 5 ghmC is a different moiety.

The term "minimal residual disease" or "MRD" refers to the small number of cancer cells in the body after cancer treatment. MRD testing may be performed to determine whether the cancer treatment is working and to guide further treatment plans. Various metrics can be used to assess MRD, including, but not limited to, response to treatment, tumor load, residual tumor post-surgery, relapse, secondary screen, primary screen, and cancer progression.

The term "Next Generation Sequencing" or "NGS" generally applies to sequencing libraries of genomic fragments of a size of less than 1 kb.

As used herein, the term "healthy" refers to a subject not having a disease, or a sample derived therefrom. While health is a dynamic state, the term may refer to the pathological state of a subject that lacks a referenced disease state, for example, a cancer. In one example, when referring to a methylation profile that classifies subjects with cancer, the term "healthy" refers to an individual lacking cancer, such as CRC. While other diseases or states of health may be present in that subject, the term "healthy" may indicate the lack of a stated disease for comparison or classification purposes between subjects having and lacking a disease state, and samples derived therefrom.

As used herein, the term "threshold" generally refers to a value that is selected to discriminate, separate, or distinguish between two populations of subjects. In some embodiments, the threshold discriminates methylation status between a disease (e.g., malignant) state, and a non-disease (e.g., healthy) state. In some embodiments, the threshold discriminates between stages of disease (e.g., stage 1, stage 2, stage 3, or stage 4). Thresholds may be set according to the disease in question, and may be based on earlier analysis, e.g., of a training set or determined computationally on a set of inputs having known characteristic (e.g., healthy, disease, or stage of disease). Thresholds may also be set for a gene region according to the predictive value of methylation at a particular site. Thresholds may be different for each methylation site, and data from multiple sites may be combined in the end analysis.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are described herein.

The citation of any publication is for its disclosure prior to the filing date and should not be construed as an admission that the present claims are not entitled to antedate such publication by virtue of prior invention. Further, the dates of publication provided can be different from the actual publication dates which can be independently confirmed.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

All patents and publications, including all sequences disclosed within such patents and publications, referred to herein are expressly incorporated by reference.

II. Targeted Methylation Sequencing

In targeted methylation sequencing approaches, targeted regions in a biological sample, such as cfDNA, are analyzed to determine the methylation state of the target gene sequences. In some embodiments, the target region comprises, or hybridizes under stringent conditions to, contiguous nucleotides of target regions of interest, such as at least about 16 contiguous nucleotides of a target region of interest. In different examples, targeted sequencing may be accomplished using hybridization capture and amplicon sequencing approaches.

A. Hybridization Capture

The hybridization method provided herein may be used in various formats of nucleic acid hybridizations, such as in-solution hybridization and such as hybridization on a solid support (e.g., Northern, Southern, and in situ hybridization on membranes, microarrays, and cell/tissue slides). In particular, the method is suitable for in-solution hybrid capture for target enrichment of certain types of genomic DNA sequences (e.g., exons) employed in targeted next-generation sequencing. For hybrid capture approaches, a cell-free nucleic acid sample is subjected to library preparation. As used herein, "library preparation" comprises end-repair, A-tailing, adapter ligation, or any other preparation performed on the cell-free DNA to permit subsequent sequencing of DNA. In certain examples, a prepared cell-free nucleic acid library sequence contains adapters, sequence tags, and index barcodes that are ligated onto cell-free nucleic acid sample molecules. Various commercially available kits are available to facilitate library preparation for next-generation sequencing approaches. Next-generation sequencing library construction may comprise preparing nucleic acids targets using a coordinated series of enzymatic reactions to produce a random collection of DNA fragments, of specific size, for high throughput sequencing. Advances and the development of various library preparation technologies have expanded the application of next-generation sequencing to fields such as transcriptomics and epigenetics.

Improvements in sequencing technologies have resulted in changes and improvements to library preparation. Next-generation sequencing library preparation kits used herein include those developed by companies such as Agilent®, Bioo Scientific®, Kapa Biosystems®, New England Biolabs®, Illumina®, Life Technologies®, Pacific Biosciences®, and Roche®.

In various examples for targeted capture gene panels, various library preparation kits may be selected from Nextera Flex (Illumina®), IonAmpliseq (Thermo Fisher Scientific®), and Genexus (Thermo Fisher Scientific®), Agilent ClearSeq® (Illumina®), Agilent SureSelect® Capture (Illumina®), Archer FusionPlex® (Illumina®), BiooScientific NEXTflex® (Illumina®), IDT xGen (Illumina®), Illumina TruSight® (Illumina®), Nimblegene SeqCap® (Illumina®), and Qiagen GeneRead® (Illumina®)

In some embodiments, the hybrid capture method is carried out on the prepared library sequences using specific probes. As used herein, the term "specific probe" may refer to a probe that is specific for a known methylation site. In some embodiments, the specific probes are designed based on using human genome as a reference sequence and using specified genomic regions known to have methylation sites as target sequences. Specifically, the genomic region known to have methylation sites may comprise at least one of the following: a promoter region, a CpG island region, a CGI shore region, and an imprinted gene region. Therefore, when carrying out the hybrid capture by using the specific probes of some embodiments, the sequences in the sample genome that are complimentary to the target sequences, e.g., regions in the sample genome known to have methylation sites (which are also referred to as "specified genomic regions" herein), may be captured efficiently.

According to an example, the methylated regions described herein are used for designing the specific probes. In some embodiments, the specific probes are designed using commercially available methods, such as, for example, an eArray system. The length of the probes may be sufficient to hybridize with sufficient specificity to the methylated region of interest. In various examples, the probe is a 10-mer, 11-mer, 12-mer, 13-mer, 14-mer 15-mer, 16-mer, 17-mer, 18-mer, 19-mer, or 20-mer.

Targeted regions for methylation analysis may be screened out by making use of database resources (such as gene ontology). According to the principle of complementary base pairing, a single-stranded capture probe may be combined with a single-stranded target sequence complementarily, so as to capture the target region successfully. In some embodiments, the designed probes may be designed as a solid capture chip (wherein the probes are immobilized on a solid support) or as a liquid capture chip (wherein the probes are free in the liquid). However, due to limiting factors, such as probe length, probe density, and high cost, the solid capture chip is rarely used, whereas the liquid capture chip is used more frequently In some embodiments, compared with normal sequences (where the average content of A, T, C, and G base is each 25%), GC-rich sequences (where the average content of GC bases is higher than 60%) may lead to the reduction of capture efficiency because of the molecular structures of C and G bases. For the key research regions, for example, CGI regions (CpG islands), an increased amount of the probes may be required to obtain sufficient and accurate CGI data B. Amplicon-Based Sequencing Fragments of the converted DNA may be amplified. In some embodiments, the amplifying is carried out with primers designed to anneal to methylation converted target sequences having at least one methylated site therein. Methylation sequencing conversion results in unmethylated cytosines being converted to uracil, while 5-methylcytosine is unaffected. "Converted target sequences" may refer to sequences in which cytosines known to be methylation sites are fixed as "C" (cytosine), whereas cytosines known to be unmethylated are fixed as "U" (uracil; which may be treated as "T" (thymine) for primer design purposes).

In various examples, the source of the DNA is cell-free DNA obtained from whole blood, plasma, serum, or genomic DNA extracted from cells or tissue. In some embodiments, the size of the amplified fragment is between about 100 and 200 base pairs in length. In some embodiments, the DNA source is extracted from cellular sources (e.g., tissues, biopsies, cell lines), and the amplified fragment is between about 100 and 350 base pairs in length. In some embodiments, the amplified fragment comprises at least one 20 base pair sequence comprising at least one, at least two, at least three, or more than three CpG dinucleotides. The amplification may be carried out using sets of primer oligonucleotides according to the present disclosure, and may use a heat-stable polymerase. The amplification of several DNA segments may be carried out simultaneously in one and the same reaction vessel. In some embodiments, two or more fragments are amplified simultaneously. For example, the amplification may be carried out using a polymerase chain reaction (PCR).

Primers designed to target such sequences may exhibit a degree of bias towards converted methylated sequences. In some embodiments, the PCR primers are designed to be methylation specific for targeted methylation-sequencing applications. Methylation specific primers may allow for greater sensitivity in some applications. For instance, primers may be designed to include a discriminatory nucleotide (specific to a methylated sequence following bisulfite conversion) that is positioned to achieve optimal discrimination, e.g., in PCR applications. The discriminatory may be positioned at the 3' ultimate or penultimate position.

In some embodiments, the primers are designed to amplify DNA fragments 75 to 350 bp in length, which is the general size range for circulating DNA. Optimizing primer design to account for a target size may increase sensitivity of a method described herein. The primers may be designed to amplify regions that are about 50 to 200, about 75 to 150, or about 100 or 125 bp in length.

In one embodiment, the amplification step comprises using primers that contain a unique dual index (UDI) sequence.

In one embodiment, the UDI sequences are 4 bp, 5 bp, 6 bp, 7 bp, 8 bp, 9 bp, 10 bp, 11 bp, or 12 bp in length.

In some embodiments, the methylation status of preselected CpG positions within the nucleic acid sequences is detected by the amplicon-based approach using of methylation-specific PCR (MSP) primer oligonucleotides. The use of methylation-specific primers for the amplification of bisulfite treated DNA allows the differentiation between methylated and unmethylated nucleic acids. MSP primers pairs contain at least one primer which hybridizes to a converted CpG dinucleotide. Therefore, the sequence of said primers comprises at least one CpG, TpG, or CpA dinucleotide. MSP primers that are specific for non-methylated DNA contain a "T" at 3' position of the C position in the CpG. Therefore, the base sequence of these primers may include a sequence having a length of at least 18 nucleotides which hybridizes to a pretreated nucleic acid sequence and sequences complementary thereto, and the base sequence has at least one CpG, TpG, or CpA dinucleotide. In some embodiments of the method, the MSP primers have between 2 and 5 CpG, TpG, or CpA dinucleotides. In some embodiments, the dinucleotides are located within 3' half of the primer, e.g., for a primer having 18 bases in length, the specified dinucleotides are located within the first 9 bases from 3' end of the sequence. In addition to the CpG, TpG, or CpA dinucleotides, the primers may further include several methyl converted bases (e.g., cytosine converted to thymine, or on the hybridizing strand, guanine converted to adenosine). In some embodiments, the primers are designed to have no more than 2 cytosine and/or guanine bases.

In some embodiments, each of the regions is amplified in sections using multiple primer pairs. In some embodiments, these sections are non-overlapping. The sections may be immediately adjacent or spaced apart (e.g., spaced apart up to 10, 20, 30, 40, or 50 bp). Since target regions (including CpG islands, CpG shores, and/or CpG shelves) are usually longer than 75 to 150 bp, this example permits the methylation status of sites across more (or all) of a given target region to be assessed.

Primers may be designed for target regions using suitable tools such as Primer3, Primer3 Plus, Primer-BLAST, etc. As discussed, bisulfite conversion results in cytosine converting to uracil and 5'-methyl-cytosine converting to thymine. Thus, primer positioning or targeting may make use of bisulfite converted methylate sequences, depending on the degree of methylation specificity required.

III. Library Preparation for Enzymatic Methylation Sequencing

In a first aspect, methods are provided for the preparation of a sequencing library. The methods described herein provide a library that is acceptable for both next generation non-methylation and methylation sequencing applications, thereby providing sequencing data for two applications from a single sample. The resulting raw sequencing data may be used for methylation state analysis, as well as more conventional cfDNA analysis, such as copy number alterations, germline variant detection, somatic variant detection, nucleosome positioning, transcription factor profiling, chromatin immunoprecipitation, and the like.

A. Adapter Ligation for Targeted Sequencing Applications

In one aspect, the present methods preserve the integrity and information of nucleic acid sequences for methylation profiling. In one example, combining dsDNA adapter ligation before enzymatic conversion preserves fragment endpoint information while providing the highest possible library complexity for target enrichment (or directly for genome-wide sequencing), thereby providing greater sensitivity to detect rare events, such as methylated ctDNA. The advantages and comparison of adapter ligation before conversion is shown in FIG. 1.

Figure 2:
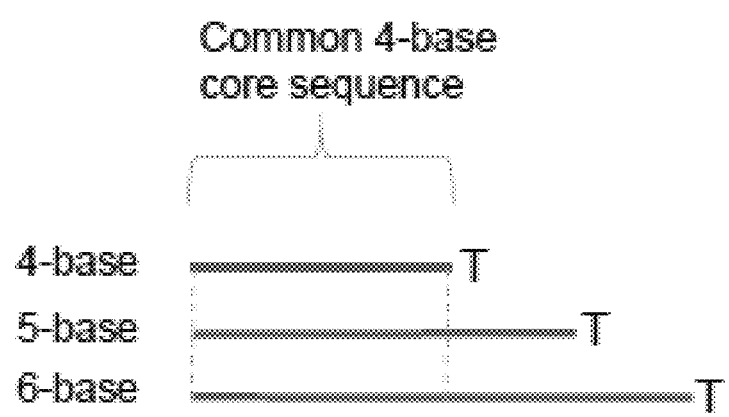
FIG. 2 provides a schematic showing staggered adapters useful in the methods described herein.

In one example, nucleic acid adapters are ligated to the 5' and 3' ends of a population of nucleic acid fragments in a biological sample to produce a sequencing library. In one example, a collection of nucleic acid adapters is ligated to the nucleic acid fragments in a sample where the collection of adapters includes equal parts of 4 bp, 5 bp, and 6 bp unique molecular identifier (UMI) sequences followed by an invariant thymidine (T) at the last position (i.e., 3' end) to enable T/A overhang ligation. Thus, the UMIs are located adjacent to the library insert nucleic acid. During sequencing, the UMIs are also sequenced as a part of the read at the 5' end (alternatively, the UMIs are in line with the library insert at the sequencing read level). The invariant T is staggered over 3 positions to maintain base diversity at the sequenced position. In contrast, using a single-length UMI with an invariant thymidine leads to low-complexity sequencing at the position corresponding to the invariant thymidine resulting in reduced sequencing quality. The first 4 bp of each UMI together comprise a set of 4-bp core UMI sequences that have an edit distance of greater than or equal to 2 and are nucleotide and color balanced. Using a single length core UMI, despite variable-length UMI sequences, facilitates the use of bioinformatic tools that are built for single-length UMIs for UMI extraction and deduplication. Thus, the 4-bp core sequence serves as a recognition sequence that informs the bioinformatic tool to trim 5, 6, or 7 bases (inclusive of the invariant T), thereby maintaining precise cfDNA end point information. A schematic illustrating the staggered adapters is shown in FIG. 2. The use of UMIs permits read deduplication, single-stranded error correction, and duplex reconstruction after sequencing, thereby permitting use of a read's reverse complement to enhance error correction, also referred to as double-stranded error correction. In another example, unique dual indexes (UDI) are additional sequences that may be added to the UMI-containing adapters during library preparation to provide sample barcoding and de-multiplexing of samples after sequencing. In various examples, the UDI sequences are 4 bp, 5 bp, 6 bp, 7 bp, 8 bp, or 12 bp in length.

In various embodiments, the nucleic acid adapters may include UMIs of 4 bp to 6 bp in length with a 5' thymidine overhang. The UMIs are designed to be non-unique (i.e., drawn from a specific, constrained set of sequences).

In one embodiment, some UMIs contain one or more methylcytosine bases. The efficiency of the enzymatic methylation conversion reactions (including TET oxidation and APOBEC deamination) can be assessed based on the fraction of UMIs that do not match the specific, constrained set of designed UMI sequences by a UMI mismatch rate. The UMI mismatch rate may be used as an embedded quality control metric to assess sequencing library quality. In addition, if perfect UMI matches are required in the bioinformatics pipeline, then the UMI mismatch rate may be used as a filter to remove individual reads that may be of lower quality due to incomplete conversion.

In various embodiments, the UMI mismatch rate is less than 6%, less than 5%, less than 4%, less than 3%, or less than 2%.

In another embodiment, the UMIs contain one or more cytosines containing modifications that may be used to monitor the enzymatic activities. Non-limiting examples of these modified bases include 5-methylcytosine, 5-hydroxymethylcytosine, 5-formylcytosine, and 5-carboxylcytosine.

B. Enzymatic Conversion for DNA Methylation Sequencing Applications

Tet-assisted pyridine borane sequencing (TAPS) is a minimally destructive conversion methylation sequencing method for converting cytosines to uracil in nucleic acid. This bisulfite-free method allows minimal degradation of DNA, and thus preserves the length of nucleic acid molecules while achieving conversion rates similar to sodium bisulfite sequencing. TAPS can result in higher sequencing quality scores for cytosines and guanine base pairs, and can provide a more even coverage of various genomic features, such as CpG islands.

In TAPS, a ten-eleven translocation (Tet1) enzyme oxidizes both 5 mC and 5 hmC to 5 caC. Pyridine borane reduces 5 caC to dihydrouracil, a uracil derivative that is then converted to thymine after PCR. TAPS can be performed in two other ways: TAPSβ and chemical-assisted pyridine borane sequencing (CAPS). In TAPSβ, β-glucosyltransferase is used to label 5 hmC with glucose to protect 5 hmC from the oxidation and reduction reactions and allows for specific detection of 5 mC. In CAPS, potassium perruthenate acts as the chemical replacement for Tet1 and specifically oxidizes 5 hmC, thus allowing for direct detection.

In one example, the combination of enzymatic conversion of unmodified C to U, and staggering UMI adapters in line with the library insert, are useful for targeted sequencing of methylation libraries. For low-depth sequencing applications, this combination may permit reduced volume inputs of plasma or mass inputs of cfDNA as compared to bisulfite conversion sequencing because sample cfDNA is not degraded to the same extent.

For high-depth sequencing applications, higher depth sequencing may be obtained as compared to bisulfite conversion sequencing from similar inputs of plasma or cfDNA because cfDNA is not degraded to the same extent.

In one example, the cytosines present in adapter nucleic acid are modified with a 5-methyl group or 5-hydroxymethyl group to prevent C-to-T conversion in the adapters.

One advantage of this approach is that adapter ligation before conversion maintains fragment endpoint and length information as compared to an approach that performs bisulfite conversion followed by ssDNA adapter ligation. The considerable degradation of nucleic acid before ligating adapters may result in loss of informative fragment endpoint and length information.

Enzymatic unmodified C conversion to U is less harsh on sample nucleic acid fragments and may result in more complete and uniform coverage as compared to bisulfite conversion methods. Bisulfite degradation of DNA is not uniform such that some sequences are preferentially degraded over others, including CG dinucleotides, which are the very sites being interrogated in methylation sequencing. Thus, the enzymatic approach provides a higher coverage of CpG sites than bisulfite conversion methods using the same number of unique reads, and greater uniformity of captured reads in target enrichment applications. Furthermore, non-bisulfite methods (e.g., enzymatic and TAPS-like chemical conversion) provide increased resolution of biological signal, and specifically, the ability to differentiate 5 mC and 5 hmC methylation in a nucleic acid sequence. This information and additional resolution may be informative in computational approaches and other methods.

In some examples, subjecting the DNA or the barcoded DNA to enzymatic reactions that convert cytosine nucleobases of the DNA or the barcoded DNA into uracil nucleobases includes "performing enzymatic conversion".

In various examples, glucosylation and oxidation reactions overcome the observed inherent deamination of 5 hmC and 5 mC by deaminases. Deaminases converts 5 mC and unmodified C to U, but does not convert 5 ghmC and 5 caC. Non-limiting examples of deaminases include APOBEC (apolipoprotein B mRNA editing enzyme, catalytic polypeptide-like). Embodiments described herein utilize enzymes that substantially have no sequence bias in glucosylation, oxidation, and deamination of cytosine. Moreover, these embodiments provide substantially no non-specific damage of the DNA during the glucosylation, oxidation, and deamination reactions.

In some embodiments, a glucosyltransferase (GT), e.g., beta-glucosyltransferase (βGT), is utilized to covalently link glucose to 5 hmC to protect this modified base from deamination. Other enzymatic or chemical reactions may be used for modifying the 5 hmC to achieve the same effect.

In general and in one aspect, a method provided herein includes (a) treating an aliquot (portion) of a nucleic acid sample with a dioxygenase, e.g., TET2, and βGT in a reaction mix to produce a reaction product in which substantially all modified cytosines (Cs) are either oxidized, or in the case of 5 hmC, glucosylated; and (b) treating this reaction product with cytidine deaminase to convert substantially all unmodified Cs to U. The term "modified" cytosines used in throughout these examples and embodiments refers to one or more of 5 mC, 5 hmC, 5 ghmC, 5 fC, and 5 caC where oxidation to completion of 5 mC, 5 hmC, and 5 fC results in 5 caC. βGT reacts with 5 hmC only. However, some of the 5 hmC may be converted to 5 fC and then to 5 caC by the dioxygenase before glucosylation occurs. In the presence of the dioxygenase, 5 mC is largely oxidized to completion to 5 caC, but some residual 5 hmC may be produced. However, residual 5 hmC may be glucosylated by βGT to prevent the low deamination rate of 5 hmC that may otherwise reduce accuracy of methylation sequencing.

The method described therefore largely discriminates between unmodified and modified cytosine by treating the nucleic acid with a dioxygenase before deamination. However, the amount of naturally occurring 5 mC in genomic DNA may substantially exceed the amount of 5 hmC, which in turn, may exceed the amount of naturally occurring 5 fC and 5 caC. Hence, the amount of naturally occurring modified cytosine generally is considered to be an approximate of the amount of naturally occurring 5 mC.

In one example, the method can be adapted to perform 5 hmC sequencing. The 5 hmC sequencing method may further include: treating an aliquot of the nucleic acid sample with βGT in the absence of dioxygenase, followed by treatment with cytidine deaminase to produce a reaction product in which substantially all the 5 hmCs in the aliquot are glucosylated, and substantially all the unmodified Cs and 5 mCs are converted to Us. After PCR amplification, the Us are converted to Ts, and thus, cytosine and 5 mC become indistinguishable when sequenced. The resultant reaction product can be sequenced and compared to a reference sequence to differentiate 5 hmCs from Cs and from 5 mCs. Differentiation of these moieties allows mapping of these modified nucleotides to a reference sequence, for example, a reference sequence from a database or an independently determined reference sequence.

In some embodiments, the dioxygenase with βGT plus deaminase reaction product or an amplification product thereof may be sequenced to determine which Cs are methylated (which may include a minor fraction of 5 hmC) and which Cs are unmodified. In some embodiments, the βGT without dioxygenase plus deaminase reaction product or an amplification product thereof may be sequenced to determine which Cs are hydroxymethylated and which Cs are not hydroxymethylated. In some embodiments, the βGT without dioxygenase plus deaminase reaction product or an amplification product thereof may be sequenced to determine which Cs are hydroxymethylated and which Cs are unmodified. A reference DNA may be generated by sequencing a resulting reaction product that is produced by not reacting the nucleic acid sample with any one of dioxygenase, βGT, and deaminase. Alternatively, a reference sequence is a known reference sequence, e.g., from a database of sequences.

In one embodiment, the sequence of the dioxygenase with βGT plus deaminase reaction product can be compared to the reference sequence. Optionally, this can also be compared to the sequence of the βGT (without dioxygenase) plus deaminase reaction product to determine which cytosines in the nucleic acid sample are modified by a methyl versus a hydroxymethyl group.

In one aspect, a method is provided for performing targeted methylation sequencing of a nucleic acid sample comprising:
a) ligating a nucleic acid adapter comprising a unique molecular identifier to the cfDNA, wherein the cfDNA comprises unconverted nucleic acids;

b) enzymatically converting unmethylated cytosines to uracils in nucleic acid molecules to produce converted nucleic acids;
c) amplifying the converted nucleic acids by polymerase chain reaction;
d) probing the converted nucleic acids with nucleic acid probes that are complementary to a pre-identified panel of CpG or CH loci to enrich for sequences corresponding to the pre-identified panel of CpG or CH loci;
e) determining the nucleic acid sequence of the converted nucleic acids at a depth of >100×; and
f) comparing the nucleic acid sequence of the converted nucleic acids to a reference nucleic acid sequence of the pre-identified panel of CpG or CH loci to determine the methylation profile of the cell-free DNA (cfDNA) sample from the subject.

If the test converted nucleic acid sequence is a T that corresponds to the reference C at a specified CpG locus, then the C was unmethylated in the original test nucleic acid fragment. In contrast, if the test converted nucleic acid sequence and the reference sequence are both C at a specified CpG locus, then the C was methylated in the original test nucleic acid fragment.

In one example, the nucleic acid sequence of the converted nucleic acid molecules is sequenced at a depth of between about 50-500×, about 25-1000×, about 50-500×, about 250-750×, about 500-200×, about 750-1500×, or about 100-2000×. In some embodiments, a nucleic acid sequence is sequenced at a depth of >100× or >500×.

In one example, the nucleic acid sequence of the converted nucleic acid molecules is sequenced at a depth of about 500×, about 1000×, about 2000×, about 3000×, about 4000×, about 5000×, about 6000×, about 7000×, about 8000×, about 9000×, about 10000×, or greater than 5000×.

In one example, the nucleic acid sequence of the converted nucleic acid molecules is sequenced at a depth of about 300× unique, about 400× unique, about 500× unique, about 600× unique, about 700× unique, about 800× unique, about 900× unique, or about 1000× unique, or greater than 500× unique.

C. Target Enrichment Sequencing Applications

Further provided are methods for enriching methylated regions of interest in target capture applications during sequencing. A potential problem with applying target enrichment capture panels with DNA methylation libraries is a low rate of on-target reads/high rate of off-target DNA fragment capture. For every region in a panel, probes may be designed to target DNA derived from methylated CpGs or DNA derived from unmethylated CpGs. In either probe type, every CpG site along the region is considered unmethylated or methylated, as appropriate for the probe type. The probes may be hybridized to library molecules after bisulfite/enzymatic conversion and PCR amplification. Only the library molecules that are captured by the probes are then sequenced. This method has the advantage of reducing sequencing costs since only a small fraction of the genome is sequenced. In one example, about 0.1% of the genome is sequenced. In one example, about 0.3% of the genome is sequenced. In one example, about 0.5% of the genome is sequenced. In one example, about 0.7% of the genome is sequenced. In one example, about 1% of the genome is sequenced. In other examples, about 2%, about 3%, about 4%, about 5%, about 6%, about 7%, about 8%, about 9%, or about 10% of the genome is sequenced.

Significant off-target capture rates may occur with target capture enrichment approaches on both bisulfite and enzymatic converted libraries. Off-target capture rates are partly due to C-to-T conversion of all cytosines that are not in CpG sites in both types of probes that are hybridize to DNA derived from methylated CpGs. Decreasing cytosine content in probes leads to reduced sequence complexity, and hence, less specificity of probes hybridizing to target library molecules.

As used herein, the terms "methylated probes" and "unmethylated probes" refer to probes that are used to hybridize to methylated and unmethylated CpGs, respectively, in a post-conversion nucleic acid sequence. Probes may be designed to recognize post-conversion nucleic acids sequences. In post-conversion methylated CpG probes, Cs remain as Cs after conversion. In post-conversion unmethylated CpG probes, Cs are converted to Ts after conversion. In both post-conversion methylated and unmethylated probes, all Cs in a non-CpG dinucleotide are converted to Ts after conversion.

Methylated probes retain some cytosines (i.e., cytosines in CpG sites). In contrast, all cytosines are converted to thymines in unmethylated probes. Unmethylated probes are less complex than methylated probes and may likely preferentially contribute to off-target capture rates. In one example, probes that hybridize to DNA derived from methylated CpGs are used for target enrichment methods. In one example, probes having a substantially complementary sequence to a target that hybridize to DNA derived from methylated CpGs are used for target enrichment methods.

Probes that hybridize to DNA derived from methylated CpGs for target enrichment can be chosen to accomplish different aspects. Target capture hybridization reactions occur at a single temperature. However, the optimal melting temperature (Tm) of probes that hybridize to DNA derived from methylated CpGs is, on average, higher than the Tm of probes that are not designed to hybridize to DNA derived from methylated CpGs.

Cytosines base pairing involves 3 hydrogen bonds, whereas thymines base pairing involves 2 hydrogen bonds. Conversion of cytosines to thymines in probes lowers the Tm of the probe due to a decrease in hydrogen bonding. Since methylated probes retain some cytosines and unmethylated probes retain no cytosines, methylated probes will have an elevated Tm relative to matched unmethylated probes. As the number of CpG sites increases in a region, the difference in melting temperatures between methylated and unmethylated probes also increases. Probes with higher melting temperatures may hybridize to a target DNA fragment more efficiently than probes with lower melting temperatures. Hybridization temperatures are generally selected to be relatively high to promote on-target capture. However, at typical hybridization temperatures, methylated probes will more efficiently hybridize than unmethylated probes because of higher melting temperatures resulting from retention of some cytosines. Higher melting temperatures may lead to a bias toward higher % of CpG methylation levels measured by target capture hybridization approaches as compared to levels measured by sequencing of pre-capture libraries.

In one example, only a single probe type, methylated or unmethylated, is used in a hybridization reaction to enrich for hypermethylated or hypomethylated library molecules, respectively. Using a single type of methylated or unmethylated probe can circumvent the problem of divergent melting temperatures between the probe types. Using a single probe type may also promote more efficient capture (or enrichment) of the same DNA fragment type. In one example, the use of only methylated probes provides preferential binding of hypermethylated over hypomethylated ROIs. In another example, the use of only unmethylated probes provides enrichment of unmethylated ROIs.

Using only a single probe type also allows higher hybridization temperatures to be used to decrease off-target capture without affecting the relative balance of methylated to unmethylated ROI capture. Thus, probe panels can be designed based on the desire to enrich for hypermethylated or hypomethylated DNA fragments. In one example, where quantitation of both hypermethylated and hypomethylated DNA fragments is desired, two parallel, but separate, hybridization reactions are employed for both methylation states.

D. Methylation Analysis

In various examples, when enzymatic methylation sequencing is complete, assays are used to analyze the methylation state of nucleic acids in a biological sample. In one example, whole genome enzymatic methyl sequencing ("WG EM-seq") provides high resolution sequencing by characterizing DNA methylation of nearly every cytidine nucleotide in the genome. Other targeted methods, such as targeted enzymatic methyl sequencing ("TEM-seq"), may be useful for methylation analysis.

In other examples, assays that have conventionally been used for bisulfite conversion can be employed for minimally-destructive conversion methods, such as enzymatic conversion, TAPS, and CAPS. In various examples, assays used for methylation analysis may be mass spectrometry, methylation-specific PCR (MSP), reduced representation bisulfite sequencing (RRBS), HELP assay, GLAD-PCR assay, ChIP-on-chip assays, restriction landmark genomic scanning, methylated DNA immunoprecipitation (MeDIP), pyrosequencing of bisulfite treated DNA, molecular break light assay, methyl sensitive Southern Blotting, High Resolution Melt Analysis (HRM or HRMA), ancient DNA methylation reconstruction, or Methylation Sensitive Single Nucleotide Primer Extension Assay (msSNuPE).

The methylation profile of cfDNA can be identified by applying sequence alignment methods to map methyl-seq reads from whole genome or targeted methyl sequencing of a human reference genome. Non-limiting examples of sequence alignment methods include bwa-meth, bismark, Last, GSNAP, BSMAP, NovoAlign, Bison, Metagenomic Phylogenetic Analysis (for example, MetaPhlAn2), BLAT, Burrows-Wheeler Aligner (BWA), Bowtie, Bowtie2, Bfast, BioScope, CLC bio, Cloudburst, Eland/Eland2, GenomeMapper, GnuMap, Karma, MAQ, MOM, Mosaik, MrFAST/MrsFAST, PASS, PerM, RazerS, RMAP, SSAHA2, Segemehl, SeqMap, SHRIMP, Slider/SliderII, Srprism, Stampy, vmatch, ZOOM, and the SOAP/SOAP2 alignment tool.

E. CpG Error Correction Using Duplex UMI-Based Methylation Consensus Calling

Methylation analysis entails analysis of sequencing data based on whether the 'C' within a CpG context is read out in sequencing as a "C" (methylated) or "T" (unmethylated). However, a "T" can appear at these positions in sequencing for reasons other than there being an unmethylated CpG in the parent DNA molecule. These reasons include error introduced during sequencing, error introduced during PCR, nucleotide fill-in during end repair, DNA damage, a germline single nucleotide polymorphism (SNP) that replaces a CpG with another dinucleotide, a somatic mutation that replaces a CpG with another dinucleotide, and overconversion (i.e., 5 mC is converted to T despite the methylation mark). In addition, a "C" can appear at these positions in sequencing for reasons other than there being a methylated CpG in the parent DNA molecule. These reasons include error introduced during sequencing, error introduced during PCR, DNA damage, and incomplete conversion (i.e., unmethylated C is not converted to T despite the lack of a methylation mark). Inability to correct for most of these error modes can lead to inaccurate readouts of CpG methylation state, which can limit detection of rare events (e.g., ctDNA molecules in early-stage cancer) that requires extremely accurate readouts of CpG methylation state. In addition, methods that fail to consider duplex information cannot distinguish hemi-methylated CpG sites from symmetrically methylated CpG sites. Such information could be useful for interpreting the biological significance of methylation signals. For example, hemi-methylation directly identifies de novo methylation events, thereby allowing differentiation between de novo versus maintenance factors.

Duplex sequencing approaches overcome limitations in sequencing accuracy by addressing these widespread errors. For example, duplex sequencing reduces errors by independently tagging and sequencing each of the two strands of a DNA duplex. As the two strands are complementary, true mutations can be found at the same position in both strands. Similarly, because CpG dinucleotides are symmetric, fully methylated CpG motifs have methylated cytosines at opposing adjacent positions in both strands. In contrast, PCR or sequencing errors will result in errors in only one strand. This method uniquely capitalizes on redundant and additional information that exists across strands in double-stranded DNA, and thus, can be used to overcome technical limitations of methods that utilize data from only one strand.

For enzymatic methylation sequencing, the efficiency of APOBEC conversion of individual fragments can be assessed by the number of cytosines in CHH contexts that are sequenced as cytosines. In a APOBEC reaction that is 100% efficient, all cytosines in CHH contexts are converted to uracils and sequenced as thymines. In contrast, a cfDNA fragment that was not efficiently acted upon (i.e., incomplete conversion) by the APOBEC enzyme may contain one or more cytosines in a CHH context that were not converted to uracil, which is sequenced as cytosines. The number of unconverted cytosines in CHH contexts can be used as a filter to remove reads that may be unreliable and noisy due to incomplete conversion.

Many enzymes that act on nucleic acids have sequence preferences that lead to biases in which sites are efficiently acted upon by the enzyme. Experimental data can be used to identify the sequence preferences of individual enzymes. In various embodiments, this data may then be used to mask potential sites that are more likely to be incompletely converted by the enzyme. As an example, APOBEC A3A has a 12-fold discrimination for cytosines preceded by A relative to cytosines preceded by T.

In one example, a method of duplex methylation consensus calling is provided comprising:
  a) preparing methylation sequencing libraries from cfDNA using enzymatic conversion comprising:
    (i) ligating duplex adapters to nucleic acid fragments obtained from a biological sample;
    (ii) performing target enrichment to enable ultra-high-depth sequencing of previously-identified loci of interest;
    (iii) preparing methylation sequencing libraries from cfDNA using enzymatic conversion (such that neither strand gets damaged) and ligating duplex UMIs prior to enzymatic conversion (to tag duplex strands before the denaturation steps involved in enzymatic conversion)

b) target enrichment to enable ultra-high-depth sequencing of specific loci of interest
c) sequence enriched libraries using single-end or paired-end reads
d) for each sequenced fragment in paired-end reads, correct sequencing errors that fall within the overlap region of paired-end reads
e) collapse sequenced fragments into stranded read families to correct errors arising from PCR and sequencing; and
f) collapse stranded read families into duplex read families to identify discrepancies in inferred methylation state of symmetric CpGs.

Figure 3:
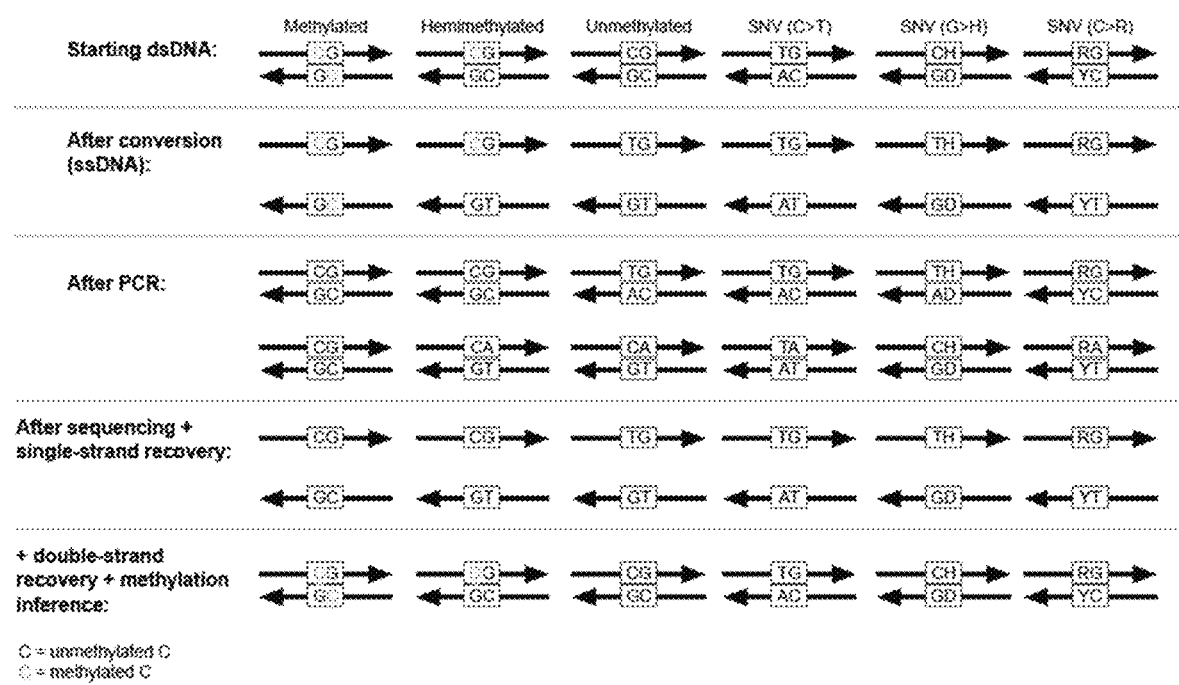
FIG. 3 provides a schematic showing duplex-like error correction methods described herein.

A schematic of this method is shown in FIG. 3.

CpG "error-correction" of methyl-seq data using duplex information provides the advantage of filtering out noise that can otherwise reduce sensitivity or specificity of a classifier that uses methyl-seq data as input. Since nucleotide imbalance is introduced into sequences after conversion, a unique UMI design that uses staggered-length methylated UMIs in the context of methyl-sequencing can help increase sequencing accuracy, potentially increase data output by helping with cluster identification (particularly using platforms such as NextSeq sequencers), and reduce dependence on adding large amounts of PhiX data (to increase sequencing depth, thereby reducing associated costs). Unlike standard duplex sequencing that analyzes concordance of variant calls at base-paired nucleotides, CpG duplex-based duplex sequencing methods evaluate the symmetry of CpG methylation across strands (1-bp offset). In certain examples, duplex sequencing may also permit differentiation of SNPs from unmethylated CpGs. Enzymatic methyl sequencing methods have advantage over bisulfite-based methods in the higher efficiency of capturing sequence of both strands.

F. CpG Error Correction Using Conversion-Tolerant Adapters for Duplex UMI-Based Methylation Consensus Calling in Enzymatic Methylation Sequencing In another aspect, conversion-tolerant adapters and primers are used for methyl sequencing. Sequencing methods used to identify the positions of base modifications, such as bisulfite sequencing or enzymatic methylation sequencing (EM-seq) used to identify 5 mC, work by chemically or enzymatically altering each unmodified cytosine base (C) to change the base-pairing properties of the Cs. For example, during the EM-seq process, all unmodified Cs are converted to uracil (U) by APOBEC enzymes, and are subsequently sequenced as a thymine (T). The 5 mC bases are not converted, and are sequenced as a C. Because the bases can only be converted when the DNA is single stranded, the double stranded DNA must be denatured before the C to U conversion reaction.

One problem that may arise when combining duplex sequencing with methylation sequencing is a reduction in PCR amplification and sequencing. Because adapters must be ligated onto the DNA while the DNA is still double stranded (i.e., prior to base conversion), all Cs in the adapters will be converted to U, thereby preventing efficient PCR amplification and sequencing.

A solution to this problem is to use adapters with modified bases (e.g., 5 mC, 5 hmC, or other C variants), which are not, or less likely to be, converted during the deamination reaction. However, oligonucleotides containing modified bases are often significantly more expensive than oligonucleotides containing only standard bases. In addition, this solution generally only works for bisulfite methyl sequencing, where 5 mC cannot be converted.

Unlike bisulfite sequencing, the EM-seq process requires an additional enzymatic step that is necessary to prevent conversion of 5 mC or 5 hmC to U by APOBEC. This step uses either a Tet enzyme to oxidize the 5 mC or 5 hmC bases, or a βGT to glucosylate 5 hmC, thereby protecting 5 hmC from conversion. If this step is not completely efficient, then some of the 5 mC or 5 hmC in the adapters will be converted to uracil, leading to a loss in library complexity and a reduction in sequencing quality. The Tet oxidation reaction is very sensitive to reaction conditions and may result in variable sequencing library quality.

To improve the robustness of EM-seq duplex sequencing to oxidation efficiency (and reduce current economic burden), conversion-tolerant adapters containing only unmodified bases can be used. Unmodified bases refer to the conventional bases guanine, cytosine, adenine, and thymine in the absence of modifications. Contrary to conventional methods for restricting total conversion of the adapter molecules using modified bases such as 5 mC or 5 hmC, this approach allows for total cytosine conversion in the adapters to provide increased efficiency and sequencing quality. An example of a conversion-tolerant adapter, comprising SEQ ID NO. 14 and SEQ ID NO. 15, is shown in FIG. 4, PANEL A.

Sequencing libraries produced with these conversion-tolerant adapters can be amplified and sequenced with a set of PCR and sequencing primers that match the original adapter sequence. After conversion, sequencing libraries can be amplified and sequenced with PCR and sequencing primers that match the converted adapter sequence FIG. 4, PANEL B. FIG. 4, PANEL B also comprises SEQ ID NO. 16 and SEQ ID NO. 17.

G. Using Internal Process Controls During Enzymatic Conversion

For targeted enzymatic methylation sequencing, synthetic internal process controls (IPCs) may be used to monitor oxidation and deamination reactions during enzymatic methylation conversion.

In various embodiments, IPCs may contain all 256 possible cytosine contexts in a window 2 bases before and after a C (NNCNN).

In various embodiments, the IPCs are duplexes synthesized by PCR that contain either 100% unmodified C, 100% methylated C, or 100% hydroxylated C (or another modification to C). In this regard, the conversion or protection efficiency of IPCs can be monitored. In some embodiments, the conversion or protection efficiency can be monitored by sequencing or quantitative PCR.

H. Hemi-Methylation Analysis

In another example, the use of UMIs in methyl-seq permits error correction and analysis/removal of hemi-methylation. Alternatively, in another example, strand-specific methylation sequencing enables identification of hemi-methylated DNA. Methylation states of CpG/CpG dyads are usually concordant, i.e., fully methylated or fully unmethylated. However, CpG dyads that are discordant in methylation, i.e., hemi-methylated, generally occur at low-to-moderate frequencies with the exception of regions undergoing transcriptional silencing or reactivation and transiently during DNA replication. These hemi-methylated dyads provide additional information that may inform a classifier that is used in stratifying a population. Recognition of hemi-methylated dyads provides a more complete methyl-seq profile, and provides the option of removing or including this information during classifier generation.

Another advantage of the enzymatic methyl sequencing approach is to better distinguish methylated Cs from unconverted Cs. Preserving fragment integrity and length by enzymatic conversion permits the use of duplex-UMI methyl-seq to increase the accuracy of determining a true methylation state of a nucleic acid molecule. This method can account for possible errors introduced during, for example, extraction (DNA damage), library preparation (end repair fill-in), enzymatic conversion (underconversion or overconversion), PCR (base-incorporation errors), and sequencing (base-calling errors). Increasing accuracy of methylation state determination improves featurization and classifier generation for stratifying a population using these methylation-based epigenetic sequence differences. In one example, the directional nature of the adapters is used to identify dsDNA fragments originating from the top versus bottom strands (based on to which genomic strand read1 maps), which is shown schematically in FIG. 3. This method is in contrast to methods that rely on an index barcode for error correction.

I. Identifying Somatic Variants

In various examples, enzymatic converted DNA is used to infer methylation states of C residues in the genome. However, because enzymatic conversion of DNA converts unmethylated C residues to U residues and does not introduce other chemical changes into the DNA, somatic variants that do not correspond to C or T bases in the reference or query sequences can also be identified in the converted DNA. These somatic variants can be identified using existing methods designed for unconverted DNA (including error-correcting methods such as duplex sequencing). Furthermore, somatic variants corresponding to C or T bases in the reference or query sequences can be distinguished from methylation-related sequencing patterns using duplex sequencing based on the expectation that somatic variants should be found at the same position in both strands of a duplex DNA molecule, whereas methylation-related patterns should not (i.e., because C and T bases are not found base-paired to each other). Collectively, this difference enables identification of both methylation states of CpG sites and somatic variants in EM-seq.

J. Inferring Nucleosome Positioning

Methylation of cytosine at CpG sites can be greatly enriched in nucleosome-spanning DNA compared to flanking DNA. Therefore, CpG methylation patterns may also be employed to infer nucleosomal positioning using a machine learning approach. The EM-seq datasets may also be analyzed according to the same methods used for WGS to generate features for input into machine learning methods and models regardless of methylation conversion. Subsequently, 5 mC patterns can be used to predict nucleosome positioning, which may aid in inferring gene expression and/or classification of disease and cancer. In another example, features may be obtained from a combination of methylation state and nucleosome positioning information.

Metrics that are used in methylation analysis include, but are not limited to, M-bias (base wise methylation % for CpG, CHG, CHH), conversion efficiency (e.g., 100-Mean methylation % for CHH), hypomethylated blocks, methylation levels (e.g., global mean methylation for CPG, CHH, CHG, chrM, LINE1, or ALU), dinucleotide coverage (normalized coverage of di-nucleotide), evenness of coverage (e.g., unique CpG sites at 1× and 10× mean genomic coverage (for S4 runs), mean CpG coverage (depth) globally and mean coverage at CpG islands, CGI shelves, and CGI shores. In one example, the output of the duplex-based CpG methylation calls is used as the input for this analysis. In one example, fragment endpoint and length information is used as feature input for analysis. These metrics may be used as feature inputs for machine learning methods and models.

In another aspect, the present disclosure provides a method, comprising: (a) providing a biological sample comprising cfDNA from a subject; (b) subjecting the cfDNA to conditions sufficient for optional enrichment of methylated cfDNA in the sample; (c) and enzymatically converting unmethylated cytosine nucleobases of the cfDNA into uracil nucleobases; (d) sequencing the cfDNA, thereby generating sequence reads; (e) computer processing the sequence reads to (i) determine a degree of methylation of the cfDNA based on a presence of the uracil nucleobases; and (ii) model the at least partial degradation of the cfDNA, thereby generating degradation parameters; and (f) using the degradation parameters and the degree of methylation to determine a genetic sequence feature.

In some examples, sequencing of cfDNA comprises determining a degree of methylation of the DNA based on a ratio of unconverted cytosine nucleobases to converted cytosine nucleobases. In some examples, the converted cytosine nucleobases are detected as uracil nucleobases. In some examples, the uracil nucleobases are observed as thymine nucleobases in sequence reads.

In some examples, generating degradation parameters comprises using a Bayesian model. In some examples, the Bayesian model is based on strand bias or enzymatic conversion or overconversion. In some examples, computer processing of the sequence reads comprises using the degradation parameters under the framework of a paired HMM or Naive Bayesian model.

K. Analyzing Differentially Methylated Regions (DMRs)

In one example, the methylation analysis is differentially methylated region (DMR) analysis. DMRs are used to quantitate CpG methylation over regions of the genome. The regions are dynamically assigned by discovery. A number of samples from different classes can be analyzed and regions that are the most differentially methylated between the different classifications can be identified. A subset of regions may be selected to be differentially methylated and used for classification. The number of CpGs captured in the region may be used for the analysis. In one example, the output of the duplex-based CpG methylation calls is used as the input for this analysis. The regions may be variable in size. In one example, a pre-discovery process is performed that bundles a number of CpG sites together as a region. In one example, DMRs are used as input features for machine learning methods and models.

L. Methylation Haplotype Blocks and Methylation Haplotype Load

In one example, a haplotype block assay is applied to the samples. Identification of methylation haplotype blocks aids in deconvolution of heterogeneous tissue samples and tumor tissue-of-origin mapping from plasma DNA. Tightly coupled CpG sites, known as methylation haplotype blocks (MHBs), can be identified in WGBS data. A metric called methylation haplotype load (MHL) is used to perform tissue-specific methylation analysis at the block level. This method provides informative blocks useful for deconvolution of heterogeneous samples. This method is useful for quantitative estimation of tumor load and tissue-of-origin mapping in circulating cfDNA. In one example, the output of the duplex-based CpG methylation calls is used as the input for this analysis. In one example, haplotype blocks are used as input features for machine learning methods and models.

M. Targeted Methylation Calling Analysis for Identifying Cell-Type of Origin In one aspect, methods are used for targeted methylation calling to identify cell-type of origin for cfDNA molecules based on methylation patterns. The method provides a probabilistic model of the joint methylation states of multiple adjacent CpG sites on an individual sequencing read to exploit the pervasive nature of DNA methylation for signal amplification. The model develops a probability of sequencing reads for each cell type and then develops a mixture model for global cell types and fitting to the model.

Traditional DNA methylation analysis focuses on the methylation rate ($\alpha$-value) of an individual CpG site in a cell population to indicate the proportion of cells in which the CpG site is methylated. Such population-average measures are often not sensitive enough to capture an abnormal methylation signal that affects only a small proportion of the cfDNAs. However, based on the pervasive nature of DNA methylation, disease specific cfDNA reads can be computationally differentiate from normal cfDNA reads.

Additionally, given the pervasive nature of DNA methylation, the joint methylation states of multiple adjacent CpG sites may be used to easily distinguish cancer-specific cfDNA reads from normal cfDNA reads. The average of methylation values of all CpG sites in a given read (denoted $\alpha$-value), provides a difference (0 and 1) between the abnormally methylated cfDNAs and the normal cfDNAs (atumor=0% and anormal=100%). The methylation $\alpha$-value is used to estimate whether the joint probability of all CpG sites in a read follows the DNA methylation signature of a disease. This method can sensitively identify multiple cell-types of origin cfDNAs out of all cfDNAs in plasma.

In various examples, alignment tools are used to align the reads to a reference genome and call the methylated cytosines. PCR duplicates are removed and the numbers of methylated and unmethylated cytosines are quantitated for each CpG site. The methylation level of a CpG cluster is calculated as the ratio between the number of methylated cytosines and the total number of cytosines within the cluster. This WGBS data processing procedure calculates the average methylation level of a CpG cluster in normal plasma samples that are used for identifying methylation markers. When a plasma cfDNA sample is used as test data, the joint methylation-status of all CpG sites of individual sequencing reads that are aligned to the regions of the marker panel is extracted and then inputted into a machine learning model. In this approach, the duplex-based CpG methylation calls are used as input features for methylation state analysis and feature generation. To improve the input data quality for the cfDNA methylation data with high coverage, reads covering <2, <3, or <4 CpG sites can be filtered out.

The methylation sequencing methods described herein improve the sequencing read quality, for example, by reducing PCR errors and bias, and reducing degradation of DNA that occurs with bisulfite conversion. In one example, the methylation sequencing data is used to model overlapping regions. In one example, machine learning modeling can determine cell type-of-origin for identified methylated DNA regions.

In various examples, the model can categorize more than two cell types-of-origin. In other examples, the model can categorize sequences to 3, 4, 5, 6, 7, 8, 9, 10, 15, 20, 50, 75, 100, or more than 100 different cell types.

N. DNA Hydroxymethylation Analysis

In one aspect of the invention, 5 hmC sequencing can be accomplished by substituting hydroxymethylation in the adapter nucleic acid at the adapter ligation step, and then only using βGT to conjugate glucose to 5 hmC residues in the test nucleic acid library inserts instead of using dioxygenase and βGT to conjugate 5 mC and 5 hmC. When the resulting sequencing data is compared to a reference genome, every C location in the reference that shows a corresponding C in the test sequence is interpreted as a hydroxymethylated C, and every C in the reference that shows as a t in the test sequence is interpreted as an unmodified C or methylated C. Thus, the data interpretation for hydroxymethylation analysis is the same as for methylation analysis.

In one aspect of the invention, methylation and hydroxymethylation sequencing libraries can be compared to specify the level of each cytosine modification (e.g., 5 m or 5 mC) at single nucleotide resolution.

In one aspect of the invention, since the hydroxymethylation status readout is the same as for methylation status, all analytical methods used with methylation sequencing data can be applied to hydroxymethylation sequencing data.

IV. Computer Systems and Machine Learning Methods

A. Sample Features

As used herein, as it relates to machine learning and pattern recognition the term "feature" may refer to an individual measurable property or characteristic of a phenomenon being observed. Features are usually numeric, but structural features such as strings and graphs are used in syntactic pattern recognition. The concept of "feature" is related to that of explanatory variable used in statistical techniques such as linear regression.

In one embodiment, the features are inputted into a feature matrix for machine learning analysis.

For a plurality of assays, the system identifies feature sets to input to a machine learning model. The system performs an assay on each molecule class and forms a feature vector from the measured values. The system inputs the feature vector into the machine learning model and obtains an output classification of whether the biological sample has a specified property.

In one embodiment, the machine learning model outputs a classifier that distinguishes between two groups or classes of individuals or features in a population of individuals or features of the population. In one embodiment, the classifier is a trained machine learning classifier.

In one embodiment, the informative loci or features of biomarkers in a cancer tissue are assayed to form a profile. Receiver Operating Characteristic (ROC) curves are useful for plotting the performance of a particular feature (e.g., any of the biomarkers described herein and/or any item of additional biomedical information) in distinguishing between two populations (e.g., individuals responding and not responding to a therapeutic agent). Typically, the feature data across the entire population (e.g., the cases and controls) are sorted in ascending order based on the value of a single feature.

In some embodiments, the condition is advanced adenoma (AA), colorectal cancer (CRC), colorectal carcinoma, or inflammatory bowel disease.

The term "input features" or "features" refers to variables that are used by the model to predict an output classification (label) of a sample, e.g., a condition, sequence content (e.g., mutations), suggested data collection operations, or suggested treatments. Values of the variables can be determined for a sample and used to determine a classification. Example of input features of genetic data include: aligned variables that relate to alignment of sequence data (e.g., sequence reads) to a genome and non-aligned variables, e.g., that relate to the sequence content of a sequence read, a measurement of protein or autoantibody, or the mean methylation level at a genomic region.

Values of the variables can be determined for a sample and used to determine a classification. Example of input features of genetic data include: aligned variables that relate to alignment of sequence data (e.g., sequence reads) to a genome and non-aligned variables, e.g., that relate to the sequence content of a sequence read, a measurement of protein or autoantibody, or the mean methylation level at a genomic region. In various examples, genetic features such as, V-plot measures, FREE-C, the cfDNA measurement over a transcription start site and DNA methylation levels over cfDNA fragments are used as input features for machine learning methods and models. In one example, the sequencing information includes information regarding a plurality of genetic features such as, but not limited to, transcription start sites, transcription factor binding sites, chromatin open and closed states, nucleosomal positioning or occupancy, and the like.

B. Data Analysis

In some embodiments, the present disclosure provides a system, method, or kit having data analysis realized in software applications, computing hardware, or both. In various embodiments, the analysis application or system includes at least a data receiving module, a data pre-processing module, a data analysis module (which can operate on one or more types of genomic data), a data interpretation module, or a data visualization module. In one embodiment, the data receiving module can comprise computer systems that connect laboratory hardware or instrumentation with computer systems that process laboratory data. In one embodiment, the data pre-processing module can comprise hardware systems or computer software that performs operations on the data in preparation for analysis. Examples of operations that can be applied to the data in the pre-processing module include affine transformations, denoising operations, data cleaning, reformatting, or subsampling. A data analysis module, which can be specialized for analyzing genomic data from one or more genomic materials, can, for example, take assembled genomic sequences and perform probabilistic and statistical analysis to identify abnormal patterns related to a disease, pathology, state, risk, condition, or phenotype. A data interpretation module can use analysis methods, for example, drawn from statistics, mathematics, or biology, to support understanding of the relation between the identified abnormal patterns and health conditions, functional states, prognoses, or risks. A data visualization module can use methods of mathematical modeling, computer graphics, or rendering to create visual representations of data that can facilitate the understanding or interpretation of results.

In various embodiments, machine learning methods are applied to distinguish samples in a population of samples. In one embodiment, machine learning methods are applied to distinguish samples between healthy and advanced adenoma samples.

In one embodiment, the one or more machine learning operations used to train the methylation-based prediction engine include one or more of: a generalized linear model, a generalized additive model, a non-parametric regression operation, a random forest classifier, a spatial regression operation, a Bayesian regression model, a time series analysis, a Bayesian network, a Gaussian network, a decision tree learning operation, an artificial neural network, a recurrent neural network, a reinforcement learning operation, linear/non-linear regression operations, a support vector machine, a clustering operation, and a genetic algorithm operation.

In various embodiments, computer processing methods are selected from logistic regression, multiple linear regression (MLR), dimension reduction, partial least squares (PLS) regression, principal component regression, autoencoders, variational autoencoders, singular value decomposition, Fourier bases, wavelets, discriminant analysis, support vector machine, decision tree, classification and regression trees (CART), tree-based methods, random forest, gradient boost tree, logistic regression, matrix factorization, multidimensional scaling (MDS), dimensionality reduction methods, t-distributed stochastic neighbor embedding (t-SNE), multilayer perceptron (MLP), network clustering, neuro-fuzzy, and artificial neural networks.

In some embodiments, the methods disclosed herein can include computational analysis on nucleic acid sequencing data of samples from an individual or from a plurality of individuals. An analysis can identify a variant inferred from sequence data to identify sequence variants based on probabilistic modeling, statistical modeling, mechanistic modeling, network modeling, or statistical inferences. Non-limiting examples of analysis methods include principal component analysis, autoencoders, singular value decomposition, Fourier bases, wavelets, discriminant analysis, regression, support vector machines, tree-based methods, networks, matrix factorization, and clustering. Non-limiting examples of variants include a germline variation or a somatic mutation. In some embodiments, a variant can refer to an already-known variant. The already-known variant can be scientifically confirmed or reported in literature. In some embodiments, a variant can refer to a putative variant associated with a biological change. A biological change can be known or unknown. In some embodiments, a putative variant can be reported in literature, but not yet biologically confirmed.

Alternatively, a putative variant is not reported in literature, but can be inferred based on a computational analysis disclosed herein. In some embodiments, germline variants can refer to nucleic acids that induce natural or normal variations.

Natural or normal variations can include, for example, skin color, hair color, and normal weight. In some embodiments, somatic mutations can refer to nucleic acids that induce acquired or abnormal variations. Acquired or abnormal variations can include, for example, cancer, obesity, conditions, symptoms, diseases, and disorders. In some embodiments, the analysis can include distinguishing between germline variants. Germline variants can include, for example, private variants and somatic mutations. In some embodiments, the identified variants can be used by clinicians or other health professionals to improve health care methodologies, accuracy of diagnoses, and cost reduction.

Also provided herein are improved methods and computing systems or software media that can distinguish among sequence errors in nucleic acid introduced through amplification and/or sequencing techniques, somatic mutations, and germline variants. Methods provided can include simultaneously calling and scoring variants from aligned sequencing data of all samples obtained from a patient.

Samples obtained from subjects other than the patient can also be used. Other samples can also be collected from subjects previously analyzed by a sequencing assay or a targeted sequencing assay (i.e., a targeted resequencing assay). Methods, computing systems, or software media disclosed herein can improve identification and accuracy of variations or mutations (e.g., germline or somatic, including copy number variations, single nucleotide variations, indels, a gene fusions), and lower limits of detection by reducing the number of false positive and false negative identifications.

C. Classifier Generation

In one aspect, the present systems and methods provide a classifier generated based on feature information derived from methylation sequence analysis from biological samples of cfDNA. The classifier forms part of a predictive engine for distinguishing groups in a population based on methylation sequence features identified in biological samples such as cfDNA.

In one embodiment, a classifier is created by normalizing the methylation information by formatting similar portions of the methylation information into a unified format and a unified scale; storing the normalized methylation information in a columnar database; training a methylation prediction engine by applying one or more one machine learning operations to the stored normalized methylation information, the methylation prediction engine mapping, for a particular population, a combination of one or more features; applying the methylation prediction engine to the accessed field information to identify a methylation associated with a group; and classifying the individual into a group.

Specificity may be defined as the probability of a negative test among those who are free from the disease. Specificity is equal to the number of disease-free persons who tested negative divided by the total number of disease-free individuals.

In various embodiments, the model, classifier, or predictive test has a specificity of at least 40%, at least 45%, at least 50%, at least 55%, at least 60%, at least 65%, at least 70%, at least 75%, at least 80%, at least 85%, at least 90%, at least 95%, or at least 99%.

Sensitivity may be defined as the probability of a positive test among those who have the disease. Sensitivity is equal to the number of diseased individuals who tested positive divided by the total number of diseased individuals.

In various embodiments, the model, classifier, or predictive test has a sensitivity of at least 40%, at least 45%, at least 50%, at least 55%, at least 60%, at least 65%, at least 70%, at least 75%, at least 80%, at least 85%, at least 90%, at least 95%, or at least 99%.

In one embodiment, the group is selected from healthy (asymptomatic), inflammatory bowel disease, AA, or CRC.

D. Digital Processing Device

In some embodiments, the subject matter described herein can include a digital processing device or use of the same. In some embodiments, the digital processing device can include one or more hardware central processing units (CPU), graphics processing units (GPU), or tensor processing units (TPU) that carry out the device's functions. In some embodiments, the digital processing device can include an operating system configured to perform executable instructions. In some embodiments, the digital processing device can optionally be connected a computer network. In some embodiments, the digital processing device can be optionally connected to the Internet such that it accesses the World Wide Web. In some embodiments, the digital processing device can be optionally connected to a cloud computing infrastructure. In some embodiments, the digital processing device can be optionally connected to an intranet. In some embodiments, the digital processing device can be optionally connected to a data storage device.

Non-limiting examples of suitable digital processing devices include server computers, desktop computers, laptop computers, notebook computers, sub-notebook computers, netbook computers, netpad computers, set-top computers, handheld computers, Internet appliances, mobile smartphones, and tablet computers. Suitable tablet computers can include, for example, those with booklet, slate, and convertible configurations.

In some embodiments, the digital processing device can include an operating system configured to perform executable instructions. For example, the operating system can include software, including programs and data, which manages the device's hardware and provides services for execution of applications. Non-limiting examples of operating systems include Ubuntu, FreeBSD, OpenBSD, NetBSD®, Linux, Apple® Mac OS X Server®, Oracle® Solaris®, Windows Server®, and Novell® NetWare®. Non-limiting examples of suitable personal computer operating systems include Microsoft® Windows®, Apple® Mac OS X®, UNIX®, and UNIX-like operating systems such as GNU/Linux®. In some embodiments, the operating system can be provided by cloud computing, and cloud computing resources can be provided by one or more service providers.

In some embodiments, the device can include a storage and/or memory device. The storage and/or memory device can be one or more physical apparatuses used to store data or programs on a temporary or permanent basis. In some embodiments, the device can be volatile memory and require power to maintain stored information. In some embodiments, the device can be non-volatile memory and retain stored information when the digital processing device is not powered. In some embodiments, the non-volatile memory can include flash memory. In some embodiments, the non-volatile memory can include dynamic random-access memory (DRAM). In some embodiments, the non-volatile memory can include ferroelectric random access memory (FRAM). In some embodiments, the non-volatile memory can include phase-change random access memory (PRAM). In some embodiments, the device can be a storage device including, for example, CD-ROMs, DVDs, flash memory devices, magnetic disk drives, magnetic tapes drives, optical disk drives, and cloud computing-based storage. In some embodiments, the storage and/or memory device can be a combination of devices such as those disclosed herein.

In some embodiments, the digital processing device can include a display to send visual information to a user. In some embodiments, the display can be a cathode ray tube (CRT). In some embodiments, the display can be a liquid crystal display (LCD). In some embodiments, the display can be a thin film transistor liquid crystal display (TFT-LCD). In some embodiments, the display can be an organic light emitting diode (OLED) display. In some embodiments, on OLED display can be a passive-matrix OLED (PMOLED) or active-matrix OLED (AMOLED) display. In some embodiments, the display can be a plasma display. In some embodiments, the display can be a video projector. In some embodiments, the display can be a combination of devices such as those disclosed herein.

In some embodiments, the digital processing device can include an input device to receive information from a user. In some embodiments, the input device can be a keyboard. In some embodiments, the input device can be a pointing device including, for example, a mouse, trackball, track pad, joystick, game controller, or stylus. In some embodiments, the input device can be a touch screen or a multi-touch screen. In some embodiments, the input device can be a microphone to capture voice or other sound input. In some embodiments, the input device can be a video camera to capture motion or visual input. In some embodiments, the input device can be a combination of devices such as those disclosed herein.

E. Non-Transitory Computer-Readable Storage Medium

In some embodiments, the subject matter disclosed herein can include one or more non-transitory computer-readable storage media encoded with a program including instructions executable by the operating system of an optionally networked digital processing device. In some embodiments, a computer-readable storage medium can be a tangible component of a digital processing device. In some embodiments, a computer-readable storage medium can be optionally removable from a digital processing device. In some embodiments, a computer-readable storage medium can include, for example, CD-ROMs, DVDs, flash memory devices, solid state memory, magnetic disk drives, magnetic tape drives, optical disk drives, cloud computing systems and services, and the like. In some embodiments, the program and instructions can be permanently, substantially permanently, semi-permanently, or non-transitorily encoded on the media.

F. Computer Systems

Figure 5:
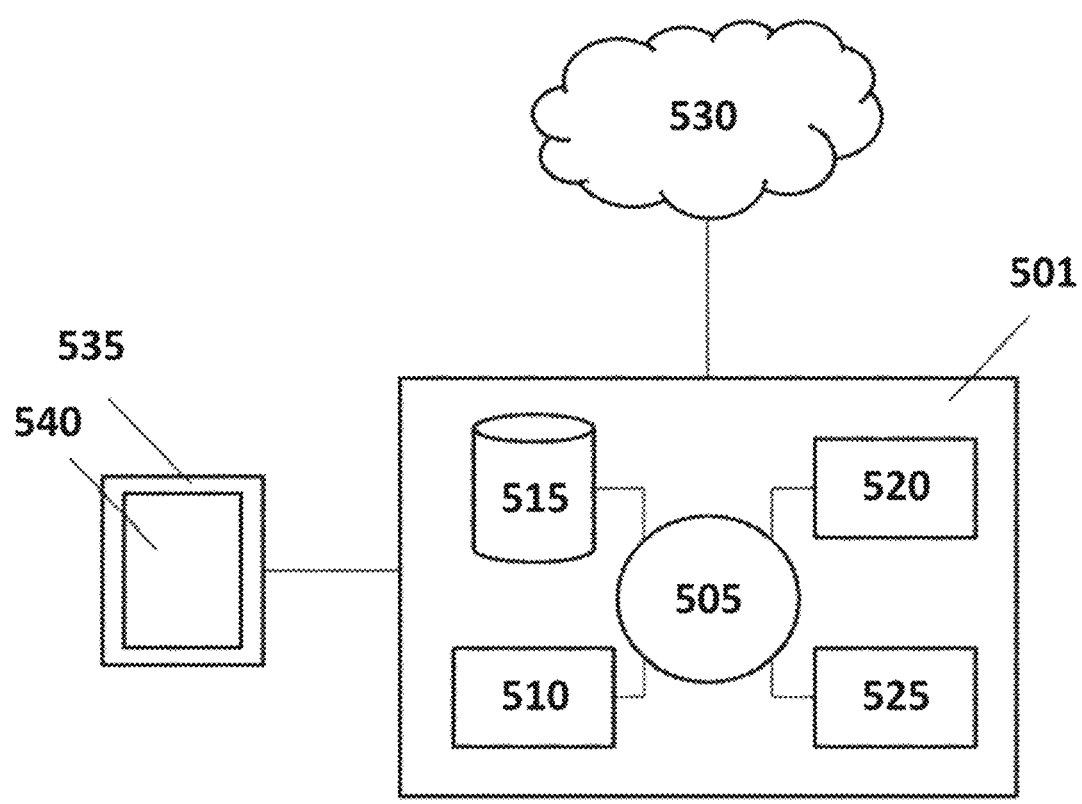
FIG. 5 shows a computer system that is programmed or otherwise configured to implement methods provided herein.

The present disclosure provides computer systems that are programmed to implement methods of the disclosure. FIG. 5 shows a computer system 501 that is programmed or otherwise configured to store, process, identify, or interpret patient data, biological data, biological sequences, or reference sequences. The computer system 501 can process various aspects of patient data, biological data, biological sequences, or reference sequences of the present disclosure. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520, and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some embodiments is a telecommunication and/or data network. The network 530 can include one or more computer servers, which can enable distributed computing, such as cloud computing. The network 530, in some embodiments with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some embodiments, the circuit is an application specific integrated circuit (ASIC).

The storage unit 515 can store files, such as drivers, libraries and saved programs. The storage unit 515 can store user data, e.g., user preferences and user programs. The computer system 501 in some embodiments can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iphone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some embodiments, the code can be retrieved from the storage unit 515 and stored on the memory 510 for ready access by the processor 505. In some embodiments, the electronic storage unit 515 can be precluded, and machine-executable instructions are stored on memory 510.

The code can be pre-compiled and configured for use with a machine having a processer adapted to execute the code or can be interpreted or compiled during runtime. The code can be supplied in a programming language that can be selected to enable the code to execute in a pre-compiled, interpreted, or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD, or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 135 that comprises a user interface (UI) 540 for providing, for example, a nucleic acid sequence, an enriched nucleic acid sample, an expression profile, and an analysis of an expression profile. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, probe a plurality of regulatory elements, sequence a nucleic acid sample, enrich a nucleic acid sample, determine an expression profile of a nucleic acid sample, analyze an expression profile of a nucleic acid sample, and archive or disseminate results of analysis of an expression profile.

In some embodiments, the subject matter disclosed herein can include at least one computer program or use of the same. A computer program can a sequence of instructions, executable in the digital processing device's CPU, GPU, or TPU, written to perform a specified task. Computer-readable instructions can be implemented as program modules, such as functions, objects, Application Programming Interfaces (APIs), data structures, and the like, that perform particular tasks or implement particular abstract data types. In light of the disclosure provided herein, those having ordinary skill in the art will recognize that a computer program can be written in various versions of various languages.

The functionality of the computer-readable instructions can be combined or distributed as desired in various environments. In some embodiments, a computer program can include one sequence of instructions. In some embodiments, a computer program can include a plurality of sequences of instructions. In some embodiments, a computer program can be provided from one location. In some embodiments, a computer program can be provided from a plurality of locations. In some embodiments, a computer program can include one or more software modules. In some embodiments, a computer program can include, in part or in whole, one or more web applications, one or more mobile applications, one or more standalone applications, one or more web browser plug-ins, extensions, add-ins or add-ons, or combinations thereof.

In some embodiments, the computer processing can be a method of statistics, mathematics, biology, or any combination thereof. In some embodiments, the computer processing method includes a dimension reduction method including, for example, logistic regression, dimension reduction, principal component analysis, autoencoders, singular value decomposition, Fourier bases, singular value decomposition, wavelets, discriminant analysis, support vector machine, tree-based methods, random forest, gradient boost tree, logistic regression, matrix factorization, network clustering, and neural network.

In some embodiments, the computer processing method is a supervised machine learning method including, for example, a regression, support vector machine, tree-based method, and network.

In some embodiments, the computer processing method is an unsupervised machine learning method including, for example, clustering, network, principal component analysis, and matrix factorization.

G. Databases

In some embodiments, the subject matter disclosed herein can include one or more databases, or use of the same to store patient data, biological data, biological sequences, or reference sequences. Reference sequences can be derived from a database. In view of the disclosure provided herein, those having ordinary skill in the art will recognize that many databases can be suitable for storage and retrieval of the sequence information. In some embodiments, suitable databases can include, for example, relational databases, non-relational databases, object-oriented databases, object databases, entity-relationship model databases, associative databases, and XML databases. In some embodiments, a database can be internet-based. In some embodiments, a database can be web-based. In some embodiments, a database can be cloud computing-based. In some embodiments, a database can be based on one or more local computer storage devices.

V. Cancer Diagnosis and Detection

The trained machine learning methods, models, and discriminate classifiers described herein are useful for various medical applications including cancer detection, diagnosis, and treatment responsiveness. As models are trained with individual metadata and analyte-derived features, the applications may be tailored to stratify individuals in a population and guide treatment decisions accordingly.

A. Diagnosis

Methods and systems provided herein may perform predictive analytics using artificial intelligence-based approaches to analyze acquired data from a subject (patient) to generate an output of diagnosis of the subject having a cancer (e.g., CRC). For example, the application may apply a prediction algorithm to the acquired data to generate the diagnosis of the subject having the cancer. The prediction algorithm may comprise an artificial intelligence-based predictor, such as a machine learning-based predictor, configured to process the acquired data to generate the diagnosis of the subject having the cancer.

The machine learning predictor may be trained using datasets, e.g., datasets generated by performing multi-analyte assays of biological samples of individuals, from one or more sets of cohorts of patients having cancer as inputs and known diagnosis (e.g., staging and/or tumor fraction) outcomes of the subjects as outputs to the machine learning predictor.

Training datasets (e.g., datasets generated by performing multi-analyte assays of biological samples of individuals) may be generated from, for example, one or more sets of subjects having common characteristics (features) and outcomes (labels). Training datasets may comprise a set of features and labels corresponding to the features relating to diagnosis. Features may comprise characteristics such as, for example, certain ranges or categories of cfDNA assay measurements, such as counts of cfDNA fragments in a biological sample obtained from a healthy and disease samples that overlap or fall within each of a set of bins (genomic windows) of a reference genome. For example, a set of features collected from a given subject at a given time point may collectively serve as a diagnostic signature, which may be indicative of an identified cancer of the subject at the given time point. Characteristics may also include labels indicating the subject's diagnostic outcome, such as for one or more cancers.

Labels may comprise outcomes such as, for example, a known diagnosis (e.g., staging and/or tumor fraction) outcomes of the subject. Outcomes may include a characteristic associated with the cancers in the subject. For example, characteristics may be indicative of the subject having one or more cancers.

Training sets (e.g., training datasets) may be selected by random sampling of a set of data corresponding to one or more sets of subjects (e.g., retrospective and/or prospective cohorts of patients having or not having one or more cancers). Alternatively, training sets (e.g., training datasets) may be selected by proportionate sampling of a set of data corresponding to one or more sets of subjects (e.g., retrospective and/or prospective cohorts of patients having or not having one or more cancers). Training sets may be balanced across sets of data corresponding to one or more sets of subjects (e.g., patients from different clinical sites or trials). The machine learning predictor may be trained until certain pre-determined conditions for accuracy or performance are satisfied, such as having minimum desired values corresponding to diagnostic accuracy measures. For example, the diagnostic accuracy measure may correspond to prediction of a diagnosis, staging, or tumor fraction of one or more cancers in the subject.

Examples of diagnostic accuracy measures may include sensitivity, specificity, positive predictive value (PPV), negative predictive value (NPV), accuracy, and area under the curve (AUC) of a ROC curve corresponding to the diagnostic accuracy of detecting or predicting the cancer (e.g., colorectal cancer).

In another aspect, the present disclosure provides a method for identifying a cancer in a subject, comprising: (a) providing a biological sample comprising cell-free nucleic acid (cfNA) molecules from said subject; (b) methylation sequencing said cfNA molecules from said subject to generate a plurality of cfNA sequencing reads; (c) aligning said plurality of cfNA sequencing reads to a reference genome; (d) generating a quantitative measure of said plurality of cfNA sequencing reads at each of a first plurality of genomic regions of said reference genome to generate a first cfNA feature set, wherein said first plurality of genomic regions of said reference genome comprises at least about 10 distinct regions, each of said at least about 10 distinct regions; and (e) applying a trained algorithm to said first cfNA feature set to generate a likelihood of said subject having said cancer.

For example, such a pre-determined condition may be that the sensitivity of predicting the cancer (e.g., colorectal cancer, breast cancer, pancreatic cancer, or liver cancer) comprises a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

As another example, such a pre-determined condition may be that the specificity of predicting the cancer (e.g., colorectal cancer, breast cancer, pancreatic cancer, or liver cancer) comprises a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

As another example, such a pre-determined condition may be that the positive predictive value (PPV) of predicting the cancer (e.g., colorectal cancer, breast cancer, pancreatic cancer, or liver cancer) comprises a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

As another example, such a pre-determined condition may be that the negative predictive value (NPV) of predicting the cancer (e.g., colorectal cancer, breast cancer, pancreatic cancer, or liver cancer) comprises a value of, for example, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99%.

As another example, such a pre-determined condition may be that the AUC of a ROC curve of predicting the cancer (e.g., colorectal cancer, breast cancer, pancreatic cancer, or liver cancer) comprises a value of at least about 0.50, at least about 0.55, at least about 0.60, at least about 0.65, at least about 0.70, at least about 0.75, at least about 0.80, at least about 0.85, at least about 0.90, at least about 0.95, at least about 0.96, at least about 0.97, at least about 0.98, or at least about 0.99.

In some examples of any of the foregoing aspects, a method further comprises monitoring a progression of a disease in the subject, wherein the monitoring is based at least in part on the genetic sequence feature. In some examples, the disease is a cancer.

In some examples of any of the foregoing aspects, a method further comprises determining the tissue-of-origin of a cancer in the subject, wherein the determining is based at least in part on the genetic sequence feature.

In some examples of any of the foregoing aspects, a method further comprises estimating a tumor burden in the subject, wherein the estimating is based at least in part on the genetic sequence feature.

B. Treatment Responsiveness

The predictive classifiers, systems and methods described herein are useful for classifying populations of individuals for a number of clinical applications (e.g., based on performing multi-analyte assays of biological samples of individuals). Examples of such clinical applications include, detecting early stage cancer, diagnosing cancer, classifying cancer to a particular stage of disease, or determining responsiveness or resistance to a therapeutic agent for treating cancer.

The methods and systems described herein are applicable to various cancer types, similar to grade and stage, and as such, is not limited to a single cancer disease type. Therefore, combinations of analytes and assays may be used in the present systems and methods to predict responsiveness of cancer therapeutics across different cancer types in different tissues and classifying individuals based on treatment responsiveness. In one example, the classifiers described herein stratify a group of individuals into treatment responders and non-responders.

The present disclosure also provides a method for determining a drug target of a condition or disease of interest (e.g., genes that are relevant/important for a particular class), comprising assessing a sample obtained from an individual for the level of gene expression for at least one gene; using a neighborhood analysis routine to determine genes that are relevant for classification of the sample, thereby ascertaining one or more drug targets relevant to the classification.

The present disclosure also provides a method for determining the efficacy of a drug designed to treat a disease class, comprising obtaining a sample from an individual having the disease class; subjecting the sample to the drug; assessing the drug-exposed sample for the level of gene expression for at least one gene; and using a computer model built with a weighted voting scheme to classify the drug-exposed sample into a class of the disease as a function of relative gene expression level of the sample with respect to that of the model.

The present disclosure also provides a method for determining the efficacy of a drug designed to treat a disease class, wherein an individual has been subjected to the drug, comprising obtaining a sample from the individual subjected to the drug; assessing the sample for the level of gene expression for at least one gene; and using a model built with a weighted voting scheme to classify the sample into a class of the disease including evaluating the gene expression level of the sample as compared to gene expression level of the model.

Yet another application is a method of determining whether an individual belongs to a phenotypic class (e.g., intelligence, response to a treatment, length of life, likelihood of viral infection or obesity) that comprises obtaining a sample from the individual; assessing the sample for the level of gene expression for at least one gene; and using a model built with a weighted voting scheme, classifying the sample into a class of the disease including evaluating the gene expression level of the sample as compared to gene expression level of the model.

Biomarkers may be useful for predicting prognosis of patients with colon cancer. The ability to classify patients as high-risk (poor prognosis) or low-risk (favorable prognosis) may enable selection of appropriate therapies for these patients. For example, high-risk patients are likely to benefit from aggressive therapy, whereas therapy may have no significant advantage for low-risk patients.

Predictive biomarkers that can guide treatment decision by identifying subsets of patients who may be "exceptional responders" to specific cancer therapies, or individuals who may benefit from alternative treatment modalities.

In one aspect, the systems and methods described herein that relate to classifying a population based on treatment responsiveness refer to cancers that are treated with chemotherapeutic agents of the classes DNA damaging agents, DNA repair target therapies, inhibitors of DNA damage signaling, inhibitors of DNA damage induced cell cycle arrest, and inhibition of processes indirectly leading to DNA damage, but not limited to these classes. Each of these chemotherapeutic agents may be considered a "DNA-damage therapeutic agent".

The patient's analyte data are classified in high-risk and low-risk patient groups, such as patient with a high-risk or low-risk of clinical relapse, and the results may be used to determine a course of treatment. For example, a patient determined to be a high-risk patient may be treated with adjuvant chemotherapy after surgery. For a patient deemed to be a low-risk patient, adjuvant chemotherapy may be withheld after surgery. Accordingly, the present disclosure provides, in certain aspects, a method for preparing a gene expression profile of a colon cancer tumor that is indicative of risk of recurrence.

In various examples, the classifiers described herein stratify a population of individuals between responders and non-responders to treatment.

In various examples, the treatment is selected from alkylating agents, plant alkaloids, antitumor antibiotics, antimetabolites, topoisomerase inhibitors, retinoids, checkpoint inhibitor therapy, and VEGF inhibitors.

Examples of treatments for which a population may be stratified into responders and non-responders include, but are not limited to: chemotherapeutic agents including sorafenb, regorafenib, imatinib, eribulin, GEMCITABINE®, capecitabine, pazopani, lapatinib, dabrafenib, sutinib malate, crizotinib, everolimus, torisirolimus, sirolimus, axitinib, gefitinib, anastrole, bicalutamide, fulvestrant, ralitrexed, pemetrexed, goserilin acetate, erlotininb, vemurafenib, visiodegib, tamoxifen citrate, paclitaxel, docetaxel, cabazitaxel, oxaliplatin, ziv-aflibercept, bevacizumab, trastuzumab, pertuzumab, pantiumumab, taxane, bleomycin, melphalen, plumbagin, CAMPTOSAR®, mitomycin-C, mitoxantrone, poly(styrenemaleic acid)-conjugated neocarzinostatin (SMANCS), doxorubicin, pegylateddoxorubicin, FOLFORI, 5-fluorouracil, temozolomide, pasireotide, tegafur, gimeracil, oteraci, itraconazole, bortezomib, lenalidomide, irintotecan, epirubicin, ROMIDEPSIN®, resminostat, tasquinimod, refametinib, lapatinib, TYVERB®, Arenegyr, NGR-TNF, pasireotide, SIGNIFOR®, ticilimumab, tremelimumab, lansoprazole, PREVONCO®, ABT-869, linifanib, vorolanib, tivantinib, TARCEVA®, erlotinib, STIVARGA®, regorafenib, fluoro-sorafenib, brivanib, liposomal doxorubicin, lenvatinib, ramucirumab, peretinoin, RUCHINKO®, muparfostat, TEYSUNO®, tegafur, gimeracil, oteracil, and orantinib; and antibody therapies including alemtuzumab, ATEZOLIZUMAB®, IPILIMUMAB®, NIVOLUMAB®, OFATUMUMAB®, pembrolizumab, or RITUXIMAB®.

In other examples, a population may be stratified into responders and non-responders for checkpoint inhibitor therapies such as compounds that bind to PD-1 or CTLA4.

In other examples, a population may be stratified into responders and non-responders for anti-VEGF therapies that bind to VEGF pathway targets.

VI. Indications

In some examples, a biological condition can include a disease. In some examples, a biological condition can be a stage of a disease. In some examples, a biological condition can be a gradual change of a biological state. In some examples, a biological condition can be a treatment effect. In some examples, a biological condition can be a drug effect. In some examples, a biological condition can be a surgical effect. In some examples, a biological condition can be a biological state after a lifestyle modification. Non-limiting examples of lifestyle modifications include a diet change, a smoking change, and a sleeping pattern change. In some examples, a biological condition is unknown. The analysis described herein can include machine learning to infer an unknown biological condition or to interpret the unknown biological condition.

In one example, the present systems and methods are particularly useful for applications related to colon cancer: Cancer that forms in the tissues of the colon (the longest part of the large intestine). Most colon cancers are adenocarcinomas (cancers that begin in cells that make line internal organs and have gland-like properties). Cancer progression is characterized by stages, or the extent of cancer in the body. Staging is usually based on the size of the tumor, whether lymph nodes contain cancer, and whether the cancer has spread from the original site to other parts of the body. Stages of colon cancer include stage I, stage II, stage III, and stage IV. Unless otherwise specified, the term "colon cancer" refers to colon cancer at Stage 0, Stage I, Stage II (including Stage IIA or IIB), Stage III (including Stage IIIA, IIIB, or IIIC), or Stage IV. In some examples herein, the colon cancer is from any stage. In one example, the colon cancer is a stage I colorectal cancer. In one example, the colon cancer is a stage II colorectal cancer. In one example, the colon cancer is a stage III colorectal cancer. In one example, the colon cancer is a stage IV colorectal cancer.

Conditions that can be inferred by the disclosed methods include, for example, cancer, gut-associated diseases, immune-mediated inflammatory diseases, neurological diseases, kidney diseases, prenatal diseases, and metabolic diseases.

In some examples, a method of the present disclosure can be used to diagnose a cancer. Non-limiting examples of cancers include adenoma (adenomatous polyps), sessile serrated adenoma (SSA), advanced adenoma, colorectal dysplasia, colorectal adenoma, colorectal cancer, colon cancer, rectal cancer, colorectal carcinoma, colorectal adenocarcinoma, carcinoid tumors, gastrointestinal carcinoid tumors, gastrointestinal stromal tumors (GISTs), lymphomas, and sarcomas.

Non-limiting examples of cancers that can be inferred by the disclosed methods and systems include acute lymphoblastic leukemia (ALL), acute myeloid leukemia (AML), adrenocortical carcinoma, Kaposi Sarcoma, anal cancer, basal cell carcinoma, bile duct cancer, bladder cancer, bone cancer, osteosarcoma, malignant fibrous histiocytoma, brain stem glioma, brain cancer, craniopharyngioma, ependymoblastoma, ependymoma, medulloblastoma, medulloepithelioma, pineal parenchymal tumor, breast cancer, bronchial tumor, Burkitt lymphoma, Non-Hodgkin lymphoma, carcinoid tumor, cervical cancer, chordoma, chronic lymphocytic leukemia (CLL), chronic myelogenous leukemia (CML), colon cancer, colorectal cancer, cutaneous T-cell lymphoma, ductal carcinoma in situ, endometrial cancer, esophageal cancer, Ewing Sarcoma, eye cancer, intraocular melanoma, retinoblastoma, fibrous histiocytoma, gallbladder cancer, gastric cancer, glioma, hairy cell leukemia, head and neck cancer, heart cancer, hepatocellular (liver) cancer, Hodgkin lymphoma, hypopharyngeal cancer, kidney cancer, laryngeal cancer, lip cancer, oral cavity cancer, lung cancer, non-small cell carcinoma, small cell carcinoma, melanoma, mouth cancer, myelodysplastic syndromes, multiple myeloma, medulloblastoma, nasal cavity cancer, paranasal sinus cancer, neuroblastoma, nasopharyngeal cancer, oral cancer, oropharyngeal cancer, osteosarcoma, ovarian cancer, pancreatic cancer, papillomatosis, paraganglioma, parathyroid cancer, penile cancer, pharyngeal cancer, pituitary tumor, plasma cell neoplasm, prostate cancer, rectal cancer, renal cell cancer, rhabdomyosarcoma, salivary gland cancer, Sezary syndrome, skin cancer, small intestine cancer, soft tissue sarcoma, squamous cell carcinoma, testicular cancer, throat cancer, thymoma, thyroid cancer, urethral cancer, uterine cancer, uterine sarcoma, vaginal cancer, vulvar cancer, Waldenstrom macroglobulinemia, and Wilms Tumor.

Non-limiting examples of gut-associated diseases that can be inferred by the disclosed methods and systems include Crohn's disease, colitis, ulcerative colitis (UC), inflammatory bowel disease (IBD), irritable bowel syndrome (IBS), and celiac disease. In some examples, the disease is inflammatory bowel disease, colitis, ulcerative colitis, Crohn's disease, microscopic colitis, collagenous colitis, lymphocytic colitis, diversion colitis, Behçet's disease, and indeterminate colitis.

Non-limiting examples of immune-mediated inflammatory diseases that can be inferred by the disclosed methods and systems include psoriasis, sarcoidosis, rheumatoid arthritis, asthma, rhinitis (hay fever), food allergy, eczema, lupus, multiple sclerosis, fibromyalgia, type 1 diabetes, and Lyme disease. Non-limiting examples of neurological diseases that can be inferred by the disclosed methods and systems include Parkinson's disease, Huntington's disease, multiple sclerosis, Alzheimer's disease, stroke, epilepsy, neurodegeneration, and neuropathy. Non-limiting examples of kidney diseases that can be inferred by the disclosed methods and systems include interstitial nephritis, acute kidney failure, and nephropathy. Non-limiting examples of prenatal diseases that can be inferred by the disclosed methods and systems include Down syndrome, aneuploidy, spina bifida, trisomy, Edwards syndrome, teratomas, sacrococcygeal teratoma (SCT), ventriculomegaly, renal agenesis, cystic fibrosis, and hydrops fetalis. Non-limiting examples of metabolic diseases that can be inferred by the disclosed methods and systems include cystinosis, Fabry disease, Gaucher disease, Lesch-Nyhan syndrome, Niemann-Pick disease, phenylketonuria, Pompe disease, Tay-Sachs disease.

The specific details of particular examples may be combined in any suitable manner without departing from the spirit and scope of disclosed examples of the invention. However, other examples of the invention may be directed to specific examples relating to each individual aspect, or specific combinations of these individual aspects. All patents, patent applications, publications, and descriptions mentioned herein are incorporated by reference in their entirety for all purposes.

VII. Kits

The present disclosure provides kits for identifying or monitoring a cancer of a subject. A kit may comprise probes for identifying a quantitative measure (e.g., indicative of a presence, absence, or relative amount) of sequences at each of a plurality of cancer-associated genomic loci in a cell-free biological sample of the subject. A quantitative measure (e.g., indicative of a presence, absence, or relative amount) of sequences at each of a plurality of cancer-associated genomic loci in the cell-free biological sample may be indicative of one or more cancers. The probes may be selective for the sequences at the plurality of cancer-associated genomic loci in the cell-free biological sample. A kit may comprise instructions for using the probes to process the cell-free biological sample to generate datasets indicative of a quantitative measure (e.g., indicative of a presence, absence, or relative amount) of sequences at each of the plurality of cancer-associated genomic loci in a cell-free biological sample of the subject. In one embodiment, the kit comprises primer sets, PCR reaction components, sequencing reagents, minimally-destructive conversion reagents, and library preparation reagents.

The probes in the kit may be selective for the sequences at the plurality of cancer-associated genomic loci in the cell-free biological sample. The probes in the kit may be configured to selectively enrich nucleic acid (e.g., RNA or DNA) molecules corresponding to the plurality of cancer-associated genomic loci. The probes in the kit may be nucleic acid primers. The probes in the kit may have sequence complementarity with nucleic acid sequences from one or more of the plurality of cancer-associated genomic loci or genomic regions. The plurality of cancer-associated genomic loci or genomic regions may comprise at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more distinct cancer-associated genomic loci or genomic regions identified for targeted methylation sequencing.

The instructions in the kit may comprise instructions to assay the cell-free biological sample using the probes that are selective for the sequences at the plurality of cancer-associated genomic loci in the cell-free biological sample. These probes may be nucleic acid molecules (e.g., RNA or DNA) having sequence complementarity with nucleic acid sequences (e.g., RNA or DNA) from one or more of the plurality of cancer-association genomic loci. These nucleic acid molecules may be primers or enrichment sequences. The instructions to assay the cell-free biological sample may comprise introductions to perform array hybridization, polymerase chain reaction (PCR), or nucleic acid sequencing (e.g., DNA sequencing or RNA sequencing) to process the cell-free biological sample to generate datasets indicative of a quantitative measure (e.g., indicative of a presence, absence, or relative amount) of sequences at each of the plurality of cancer-associated genomic loci in the cell-free biological sample. A quantitative measure (e.g., indicative of a presence, absence, or relative amount) of sequences at each of a plurality of cancer-associated genomic loci in the cell-free biological sample may be indicative of one or more cancers.

The instructions in the kit may comprise instructions to measure and interpret assay readouts, which may be quantified at one or more of the plurality of cancer-associated genomic loci to generate the datasets indicative of a quantitative measure (e.g., indicative of a presence, absence, or relative amount) of sequences at each of the plurality of cancer-associated genomic loci in the cell-free biological sample. For example, quantification of array hybridization or polymerase chain reaction (PCR) corresponding to the plurality of cancer-associated genomic loci may generate the datasets indicative of a quantitative measure (e.g., indicative of a presence, absence, or relative amount) of sequences at each of the plurality of cancer-associated genomic loci in the cell-free biological sample. Assay readouts may comprise quantitative PCR (qPCR) values, digital PCR (dPCR) values, digital droplet PCR (ddPCR) values, fluorescence values, etc., or normalized values thereof.

EXAMPLES

Example 1: Targeted EM-Seq Library Preparation and Classifier Generation

Starting Material: 10-200 ng of double stranded DNA.
1. DNA Preparation

Prior to oxidation, EDTA was removed from the DNA and the DNA sample had final volume of 29 µl. Control DNAs were used for assessing oxidation and deamination. For sequencing on an Illumina platform, the Enzymatic Methyl-seq Kit Manual (NEB #E7120) was referred to for usage recommendations.
2. Adapter Ligation
3. Oxidation of 5-Methylcytosines and 5-Hydroxymethylcytosines TET2 Buffer was prepared. The TET2 Reaction was then added to one tube of TET2 Reaction Buffer Supplement, followed by thorough mixing. On ice, TET2 Reaction Buffer, Oxidation Supplement, Oxidation Enhancer, and TET2 enzyme were added directly to the DNA sample. The mixture was then mixed thoroughly by vortexing. After centrifuging briefly, diluted Fe(II) solution was added to the mixture. The mixture was then mixed thoroughly by vortexing or by pipetting up and down, and centrifuged briefly. The mixture was then incubated at 37° C. for 1 hour in a thermocycler. The samples were then transferred to ice before treating with 1 µl of Stop Reagent (yellow). The mixture was then mixed thoroughly by vortexing or by pipetting up and down at least 10 times and centrifuged briefly. Finally, the mixture was incubated at 37° C. for 30 minutes, then at 4° C. in a thermocycler.
4. Clean-Up of TET2 Converted DNA Sample Purification Beads was re-suspended by vortex. Next, NEBNext Sample Purification Beads was added to each sample, followed by thorough mixing by pipetting up and down. The samples were incubated on the bench top for at least 5 minutes at room temperature. The tubes were then be placed against an appropriate magnetic stand to separate the beads from the supernatant. After 5 minutes (or when the solution is clear), the supernatant was carefully removed to avoid disturbing the beads that contain DNA targets, and discarded. While on the magnetic stand, freshly prepared 80% ethanol was added to each of the tubes. The samples were incubated at room temperature for 30 seconds before the supernatant was carefully removed and discarded. The wash was repeated once for a total of two washes. All visible liquid was removed after the second wash using a p10 pipette tip. The beads were then air dried for 2 minutes while the tubes are on the magnetic stand with the lid open. The tubes were then removed from the magnetic stand. The DNA was eluted from the beads with Elution Buffer. Elution Buffer was added to each of the tubes and mixed thoroughly by pipetting up and down 10 times. The samples were then incubated for at least 1 minute at room temperature. If necessary, the sample was quickly centrifuged to collect the liquid from the sides of the tube before placing the tubes back on the magnetic stand. The tubes were then placed back on the magnetic stand. After 3 minutes (or whenever the solution is clear), the eluted DNA from the supernatant were transferred to a new PCR tube.

5. Denaturation of DNA

The DNA was denatured using either Formamide or 0.1 N Sodium Hydroxide prior to deamination of cytosines.

6. Deamination of Cytosines

Over ice, APOBEC Reaction Buffer, BSA, and APOBEC were added to the denatured DNA. The mixture was then mixed thoroughly by vortexing or by pipetting up and down at least 10 times before centrifuging briefly. The mixture was then incubated at 37° C. for 3 hours, then at 4° C. in a thermocycler.

7. Clean-Up of Deaminated DNA

Sample Purification Beads was resuspended by vortex. Next, 100 µl of resuspended NEBNext Sample Purification Beads was added to each sample, followed by thorough mixing by pipetting up and down at least 10 times. During the last mix, all liquid was carefully expelled out of the tip. The samples were then incubated on the bench top for at least 5 minutes at room temperature. After 5 minutes (or when the solution is clear), the supernatant was carefully removed and discarded. While on the magnetic stand, freshly prepared 80% ethanol was added to the tubes. The samples were then incubated at room temperature for 30 seconds before the supernatant was carefully removed and discarded. The wash was repeated once for a total of two washes. Next, the beads were air dried for 90 seconds while the tubes are on the magnetic stand with the lid open. The DNA targets were then eluted from the beads with Elution Buffer. Elution Buffer was added to each of the tubes and mixed thoroughly by pipetting up and down 10 times. The samples were incubated for at least 1 minute at room temperature. If necessary, the sample was quickly centrifuged to collect the liquid from the sides of the tube before placing the tubes back on the magnetic stand. The tubes were then placed back on the magnetic stand. After 3 minutes (or whenever the solution is clear), the eluted DNA targets in the supernatant were transferred to a new PCR tube.

8. Multiplex Amplification and Targeted Methylation Classification

Raw data files were used for alignment and methylation calling with conventional tools to permit targeted methylation analysis for pre-identified regions of the genome. Whole genome amplification of enzymatic-converted DNA was carried out. Target enrichment was carried out on the enzymatic converted libraries to specifically pull down pre-identified DNA fragments that contain target CpG sites using 5'-biotinylated capture probes. Hybrid selection was carried out using Illumina TruSightVR Rapid Capture Kit. Capture Target Buffer 3 (Illumina) instead of enrichment hybridization buffer was used in the hybridization step. Following hybridization, the captured DNA fragments were amplified with 14 PCR cycles. Target capture libraries were sequenced on an Illumina HiSeqVR 2500 Sequencer using 2×100 cycle runs with four to five samples in rapid run mode. A 10% PhiX was spiked into enzymatic sequencing libraries to increase base diversity for better sequencing quality.

FASTQ files were mapped to a reference genome using conventional methods, and methylation scores were calculated for disease classification. Featurized data comprising a set of CpG sites associated with healthy, disease, disease state and treatment responsiveness was entered into machine learning models to identify classifiers that stratify individuals in a population.

Example 2: Targeted EM-Seq with Conversion-Tolerant Sequencing Adapter/Primer Systems Identified adapters of known sequence were ligated to the end of DNA molecules in a sample with unknown sequence. The adapters were then used to PCR amplify the entire library of different molecules using a single set of primers corresponding to the known adapters. During the subsequent sequencing reactions, the ligated adapter sequences were additionally used as the binding site for the sequencing primers. To take advantage of the data provided by duplex sequencing, partially double stranded adapters with unique molecular identifiers (UMIs) were ligated to double stranded DNA.

To improve robustness of EM-Seq duplex sequencing to oxidation efficiency (and reduce costs), conversion-tolerant adapters can be used to increase the consistency of sequencing library quality. The conversion-tolerant adapters contain only unmodified bases and allows for total base conversion of the adapters. An example of a conversion tolerant adapter is shown in FIG. 4, PANEL A.

Without conversion, sequencing libraries produced with these conversion-tolerant adapters can be amplified and sequenced with a set of PCR and sequencing primers that match the original adapter sequence. With conversion, sequencing libraries can be amplified and sequenced with PCR and sequencing primers that match the converted adapter sequence as shown in FIG. 4, PANEL B.

Figure 6:
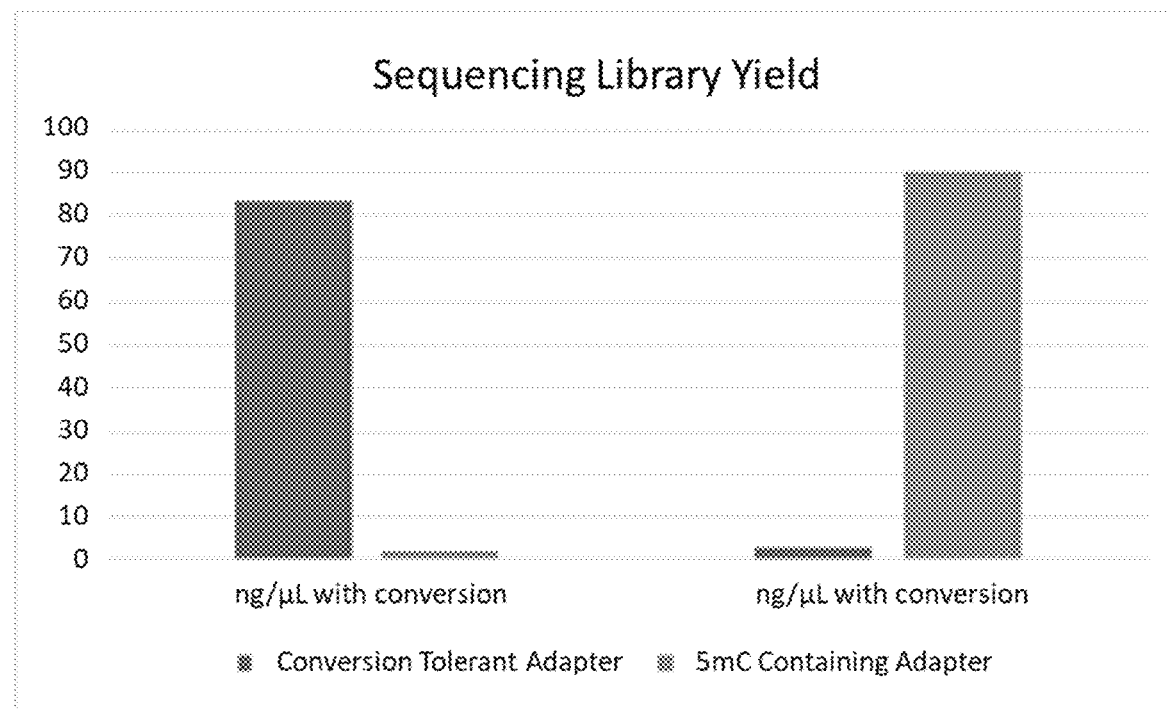
FIG. 6 provides a graph showing the sequencing library yield for an exemplary conversion-tolerant adapter/primer system. The conversion-tolerant adapter demonstrates higher greater sequencing yield with conversion compared to 5 mC containing adapter.

A functional example set of conversion tolerant adapters, PCR primers, and sequencing primers has been tested (FIG. 6). Sequencing library yield for libraries generated with either conversion-tolerant adapters or 5 mC-containing adapters. No Tet mediated oxidation step was performed, so all C and 5 mC were susceptible to C to U conversion. While the 5 mC-containing adapter system was more efficient without conversion, the conversion-tolerant adapter system required conversion so that the conversion-tolerant adapters can be amplified using the conversion-specific PCR primers. The DNA sequences for these conversion-specific PCR primers are listed in TABLE 1.

TABLE 1

| SEQ ID NO: | Oligo Name | DNA Sequence |
|---|---|---|
| 1 | Adapter Top (UMI GTCT) | TGAGGAATGAGCACGTACTGTCTT |
| 2 | Adapter Bottom (UMI GTCT) | /5'-Phosphate/AGACAGTACGTGCTCATTGATAGAGTG |

TABLE 1-continued

| SEQ ID NO: | Oligo Name | DNA Sequence |
|---|---|---|
| 3 | Index PCR Primer With Conversion F (index GACACAGT) | AATGATACGGCGACCACCGAGATCTACACGACACAGTACA CTCTTTCCCTACACGACGTTGGGTGAGGAATGAGTATGTATT |
| 4 | Index PCR Primer With Conversion R (index GACACAGT) | CAAGCAGAAGACGGCATACGAGATGACACAGTGTGACTGG AGTTCAGACGTGTCCCACTCTATCAATAAACACATACT |
| 5 | Sequencing Primer With Conversion r1 | TCCCTACACGACGTTGGGTGAGGAATGAGTATGTATT |
| 6 | Sequencing Primer With Conversion r2 | GTTCAGACGTGTCCCACTCTATCAATAAACACATACT |
| 7 | Sequencing Primer With Conversion i1 | TTATTGATAGAGTGGGACACGTCTGAACTCCAGTCAC |
| 13 | Sequencing Primer With Conversion i2 | CTCATTCCTCACCCAACGTCGTGTAGGGAAAGAGTGT |
| 8 | Index PCR Primer Without Conversion F (index GACACAGT) | AATGATACGGCGACCACCGAGATCTACACGACACAGTAC ACTCTTTCCCTACACGACGTTGGGTGAGGAATGAGCACGTACT |
| 9 | Index PCR Primer Without Conversion R (index GACACAGT) | CAAGCAGAAGACGGCATACGAGATGACACAGTGTGACTGG AGTTCAGACGTGTCCCACTCTATCAATGAGCACGTACT |
| 10 | Sequencing Primer Without Conversion r1 | TCCCTACACGACGTTGGGTGAGGAATGAGCACGTACT |
| 11 | Sequencing Primer Without Conversion r2 | GTTCAGACGTGTCCCACTCTATCAATGAGCACGTACT |
| 12 | Sequencing Primer Without Conversion i1 | TCATTGATAGAGTGGGACACGTCTGAACTCCAGTCAC |
| 13 | Sequencing Primer Without Conversion i2 | CTCATTCCTCACCCAACGTCGTGTAGGGAAAGAGTGT |

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of detecting a cancer in a subject, comprising:
   (a) ligating a nucleic acid adapter to a nucleic acid molecule of a nucleic acid sample obtained or derived from the subject, wherein the nucleic acid molecule comprises unmethylated cytosines, wherein the nucleic acid adapter is a conversion-tolerant adapter comprising guanine, thymine, adenine, and cytosine bases, and not comprising 5-methylcytosine (5 mC)-containing bases, and not comprising 5-hydroxymethylcytosine (5 hmC)-containing bases;
   (b) converting the unmethylated cytosines of the nucleic acid molecule to uracils using an enzymatic conversion method, thereby generating a converted nucleic acid molecule;
   (c) amplifying the converted nucleic acid molecule at least in part by polymerase chain reaction (PCR), thereby generating amplified converted nucleic acid molecules, wherein the PCR comprises use of sequencing primers that correspond to a sequence of the conversion-tolerant adapter, wherein primers of the PCR comprise a sequence selected from the group consisting of SEQ ID NOs. 3-7 and 13;
   (d) contacting the amplified converted nucleic acid molecules with nucleic acid probes that are at least partially complementary to a pre-identified panel of CpG, CHG, or CHH loci to enrich for sequences corresponding to the pre-identified panel of CpG, CHG, or CHH loci, thereby generating enriched nucleic acid molecules;
   (e) sequencing the enriched nucleic acid molecules or a derivative thereof at a depth of greater than 100×; and
   (f) using a computer specifically programmed to detect the cancer to perform at least:
      (i) comparing the nucleic acid sequence of the enriched nucleic acid molecules or a derivative thereof to a reference nucleic acid sequence of the pre-identified panel of CpG, CHG, or CHH loci; and
      (ii) processing the nucleic acid sequence of the enriched nucleic acid molecules or a derivative thereof using a trained machine learning model configured to detect the cancer in the subject based at least in part on the comparing in (i), wherein the trained machine learning model is trained with training data comprising: (1) a first set of biological samples obtained or derived from subjects with advanced adenoma, and (2) a second set of biological samples obtained or derived from subjects without advanced adenoma.

2. The method of claim 1, wherein the nucleic acid sample is a cell-free deoxyribonucleic acid (DNA) sample.

3. The method of claim 1, wherein the sequencing further comprises performing duplex error correction.

4. The method of claim 1, wherein the enzymatic conversion method further comprises performing sequential ten-eleven translocation/apolipoprotein B messenger ribonucleic acid (mRNA)-editing enzyme (TET/APOBEC) enzymatic conversion.

5. The method of claim 1, wherein the enzymatic conversion method further comprises performing chemical-assisted pyridine borane sequencing (CAPS).

6. The method of claim 1, wherein the enzymatic conversion method further comprises performing TET-assisted pyridine borane sequencing (TAPS).

7. The method of claim 1, wherein the nucleic acid adapter further comprises a unique dual index (UDI) sequence, wherein the UDI sequence has a length of 4 nucleotides, 5 nucleotides, 6 nucleotides, 7 nucleotides, 8 nucleotides, 9 nucleotides, 10 nucleotides, 11 nucleotides, or 12 nucleotides.

8. The method of claim 1, wherein the converted nucleic acid molecule is amplified using primers that contain a unique dual index (UDI) sequence.

9. The method of claim 1, wherein the nucleic acid probes comprise unmethylated nucleic acid probes.

10. The method of claim 1, wherein the nucleic acid probes hybridize to target regions of interest that are consistent with unmethylated cytosines at CpG sites in the reference nucleic acid sequence.

11. The method of claim 1, wherein the nucleic acid probes hybridize to target regions of interest that are consistent with methylated cytosines at CpG sites in the reference nucleic acid sequence.

12. The method of claim 1, further comprising chemically or enzymatically altering the nucleic acid probes, wherein the chemically or enzymatically altered nucleic acid probes are methylated or unmethylated nucleic acid probes.

13. The method of claim 1, wherein one or more cytosines in CG loci of the enriched nucleic acid molecules are converted to thymines, and wherein one or more cytosines in CHG or CHH loci of the enriched nucleic acid molecules are converted to thymines.

14. The method of claim 1, wherein the pre-identified panel of CpG, CHG, or CHH loci further comprises loci of transcription start sites.

15. The method of claim 1, wherein the sequences corresponding to the pre-identified panel of CpG, CHG, or CHH loci further comprise hemi-methylated CpG loci.

16. The method of claim 1, wherein the nucleic acid adapter comprises a sequence selected from the group consisting of SEQ ID NOs. 14-15.

\* \* \* \* \*

```
                        SEQUENCE LISTING

Sequence total quantity: 17
SEQ ID NO: 1            moltype = DNA  length = 24
FEATURE                 Location/Qualifiers
source                  1..24
                        mol_type = other DNA
                        organism = synthetic construct
                        note = Description of Artificial Sequence: Synthetic
                         oligonucleotide
SEQUENCE: 1
tgaggaatga gcacgtactg tctt                                          24

SEQ ID NO: 2            moltype = DNA  length = 27
FEATURE                 Location/Qualifiers
source                  1..27
                        mol_type = other DNA
                        organism = synthetic construct
                        note = Description of Artificial Sequence: Synthetic
                         oligonucleotide
modified_base           1
                        mod_base = OTHER
                        note = 5' phosphate
SEQUENCE: 2
agacagtacg tgctcattga tagagtg                                       27

SEQ ID NO: 3            moltype = DNA  length = 82
FEATURE                 Location/Qualifiers
source                  1..82
                        mol_type = other DNA
                        organism = synthetic construct
                        note = Description of Artificial Sequence: Synthetic primer
SEQUENCE: 3
aatgatacgg cgaccaccga gatctacacg acacagtaca ctctttccct acacgacgtt  60
gggtgaggaa tgagtatgta tt                                           82

SEQ ID NO: 4            moltype = DNA  length = 78
FEATURE                 Location/Qualifiers
source                  1..78
                        mol_type = other DNA
                        organism = synthetic construct
                        note = Description of Artificial Sequence: Synthetic primer
SEQUENCE: 4
caagcagaag acggcatacg agatgacaca gtgtgactgg agttcagacg tgtcccactc  60
tatcaataaa cacatact                                                78

SEQ ID NO: 5            moltype = DNA  length = 37
FEATURE                 Location/Qualifiers
source                  1..37
                        mol_type = other DNA
                        organism = synthetic construct
                        note = Description of Artificial Sequence: Synthetic primer
SEQUENCE: 5
tccctacacg acgttgggtg aggaatgagt atgtatt                            37

SEQ ID NO: 6            moltype = DNA  length = 37
FEATURE                 Location/Qualifiers
source                  1..37
                        mol_type = other DNA
                        organism = synthetic construct
                        note = Description of Artificial Sequence: Synthetic primer
SEQUENCE: 6
gttcagacgt gtcccactct atcaataaac acatact                            37
```

-continued

```
SEQ ID NO: 7           moltype = DNA   length = 37
FEATURE                Location/Qualifiers
source                 1..37
                       mol_type = other DNA
                       organism = synthetic construct
                       note = Description of Artificial Sequence: Synthetic primer
SEQUENCE: 7
ttattgatag agtgggacac gtctgaactc cagtcac                                   37

SEQ ID NO: 8           moltype = DNA   length = 82
FEATURE                Location/Qualifiers
source                 1..82
                       mol_type = other DNA
                       organism = synthetic construct
                       note = Description of Artificial Sequence: Synthetic primer
SEQUENCE: 8
aatgatacgg cgaccaccga gatctacacg acacagtaca ctctttccct acacgacgtt          60
gggtgaggaa tgagcacgta ct                                                  82

SEQ ID NO: 9           moltype = DNA   length = 78
FEATURE                Location/Qualifiers
source                 1..78
                       mol_type = other DNA
                       organism = synthetic construct
                       note = Description of Artificial Sequence: Synthetic primer
SEQUENCE: 9
caagcagaag acggcatacg agatgacaca gtgtgactgg agttcagacg tgtcccactc          60
tatcaatgag cacgtact                                                       78

SEQ ID NO: 10          moltype = DNA   length = 37
FEATURE                Location/Qualifiers
source                 1..37
                       mol_type = other DNA
                       organism = synthetic construct
                       note = Description of Artificial Sequence: Synthetic primer
SEQUENCE: 10
tccctacacg acgttgggtg aggaatgagc acgtact                                   37

SEQ ID NO: 11          moltype = DNA   length = 37
FEATURE                Location/Qualifiers
source                 1..37
                       mol_type = other DNA
                       organism = synthetic construct
                       note = Description of Artificial Sequence: Synthetic primer
SEQUENCE: 11
gttcagacgt gtcccactct atcaatgagc acgtact                                   37

SEQ ID NO: 12          moltype = DNA   length = 37
FEATURE                Location/Qualifiers
source                 1..37
                       mol_type = other DNA
                       organism = synthetic construct
                       note = Description of Artificial Sequence: Synthetic primer
SEQUENCE: 12
tcattgatag agtgggacac gtctgaactc cagtcac                                   37

SEQ ID NO: 13          moltype = DNA   length = 37
FEATURE                Location/Qualifiers
source                 1..37
                       mol_type = other DNA
                       organism = synthetic construct
                       note = Description of Artificial Sequence: Synthetic primer
SEQUENCE: 13
ctcattcctc acccaacgtc gtgtagggaa agagtgt                                   37

SEQ ID NO: 14          moltype = DNA   length = 24
FEATURE                Location/Qualifiers
source                 1..24
                       mol_type = other DNA
                       organism = synthetic construct
                       note = Description of Artificial Sequence: Synthetic
                       oligonucleotide
misc_feature           24
                       note = 3' Thymidine overhang
SEQUENCE: 14
tgaggaatga gcacgtacta acct                                                 24

SEQ ID NO: 15          moltype = DNA   length = 27
FEATURE                Location/Qualifiers
```

```
source                  1..27
                        mol_type = other DNA
                        organism = synthetic construct
                        note = Description of Artificial Sequence: Synthetic
                         oligonucleotide
modified_base           1
                        mod_base = OTHER
                        note = 5' phosphate
SEQUENCE: 15
ggttagtacg tgctcattga tagagtg                                              27

SEQ ID NO: 16           moltype = DNA  length = 23
FEATURE                 Location/Qualifiers
source                  1..23
                        mol_type = other DNA
                        organism = synthetic construct
                        note = Description of Artificial Sequence: Synthetic primer
SEQUENCE: 16
cactctatca ataaacacat act                                                  23

SEQ ID NO: 17           moltype = DNA  length = 27
FEATURE                 Location/Qualifiers
source                  1..27
                        mol_type = other DNA
                        organism = synthetic construct
                        note = Description of Artificial Sequence: Synthetic
                         oligonucleotide
modified_base           9
                        mod_base = OTHER
                        note = Uracil
modified_base           13
                        mod_base = OTHER
                        note = Uracil
modified_base           15
                        mod_base = OTHER
                        note = Uracil
SEQUENCE: 17
ggttagtatg tgtttattga tagagtg                                              27
```